US012701478B2

(12) United States Patent
Damnjanovic et al.

(10) Patent No.: US 12,701,478 B2
(45) Date of Patent: Aug. 4, 2026

(54) TRANSMISSION CONFIGURATION INDICATOR STATE INDICATION FOR INTER-DISTRIBUTED UNIT LAYER 1/LAYER 2-TRIGGERED MOBILITY

(71) Applicant: QUALCOMM Incorporated, San Diego, CA (US)

(72) Inventors: Jelena Damnjanovic, Del Mar, CA (US); Yan Zhou, San Diego, CA (US); Naeem Akl, Bridgewater, NJ (US); Tianyang Bai, Mountain View, CA (US)

(73) Assignee: Qualcomm Incorporated, San Diego, CA (US)

( * ) Notice: Subject to any disclaimer, the term of this patent is extended or adjusted under 35 U.S.C. 154(b) by 295 days.

(21) Appl. No.: 18/409,343

(22) Filed: Jan. 10, 2024

(65) Prior Publication Data

US 2024/0349144 A1 Oct. 17, 2024

Related U.S. Application Data

(60) Provisional application No. 63/496,634, filed on Apr. 17, 2023.

(51) Int. Cl.
*H04W 36/08* (2009.01)
*H04L 5/00* (2006.01)
*H04W 36/00* (2009.01)
*H04W 76/20* (2018.01)

(52) U.S. Cl.
CPC ........... *H04W 36/08* (2013.01); *H04L 5/0051* (2013.01); *H04W 36/0058* (2018.08); *H04W 36/00838* (2023.05); *H04W 76/20* (2018.02)

(58) Field of Classification Search
CPC ............. H04W 36/08; H04W 36/0058; H04W 36/00838; H04W 76/20; H04L 5/0051
See application file for complete search history.

(56) References Cited

U.S. PATENT DOCUMENTS

2017/0142620 A1* 5/2017 Rune ..................... H04W 36/38
2022/0377622 A1* 11/2022 Zhang ................... H04W 72/21
(Continued)

FOREIGN PATENT DOCUMENTS

WO WO-2024022687 A1 * 2/2024 ............. H04B 7/024
WO WO-2024167184 A1 * 8/2024 ........ H04W 72/0457

OTHER PUBLICATIONS

U.S. Appl. No. 63/353,980 Priority document for Wallentin et al. (US 20250374137) Jun. 2022 (Year: 2022).*

*Primary Examiner* — Rina C Pancholi
(74) *Attorney, Agent, or Firm* — Holland & Hart LLP

(57) ABSTRACT

Methods, systems, and devices for wireless communications are described. For example, a source distributed unit (DU) may receive, from a user equipment (UE), a measurement report indicating at least one transmission configuration indicator state (TCI) state associated with a target DU. The source DU may transmit, to the target DU, an indication of a set of candidate TCI states from the at least one TCI state for a dynamic cell switch of the UE from a source cell of the source DU to a target cell of the target DU. As such, the UE may transmit, to the target DU, a random access message or an uplink message in accordance with a first TCI state from the set of candidate TCI states.

18 Claims, 16 Drawing Sheets

(56) References Cited

U.S. PATENT DOCUMENTS

| | | | |
|---|---|---|---|
| 2023/0239748 A1* | 7/2023 | Xu | H04L 5/0023 |
| | | | 370/331 |
| 2023/0262818 A1* | 8/2023 | Kim | H04W 76/19 |
| | | | 370/328 |
| 2023/0388871 A1* | 11/2023 | Guo | H04W 36/0069 |
| 2024/0179590 A1* | 5/2024 | Cao | H04L 5/0032 |
| 2025/0374137 A1* | 12/2025 | Wallentin | H04L 5/0035 |

* cited by examiner

Network
Entity

Transceiver

910

Antenna

915

Communications
Manager

920

Memory

Code

930

925

940

Processor

935

905

900

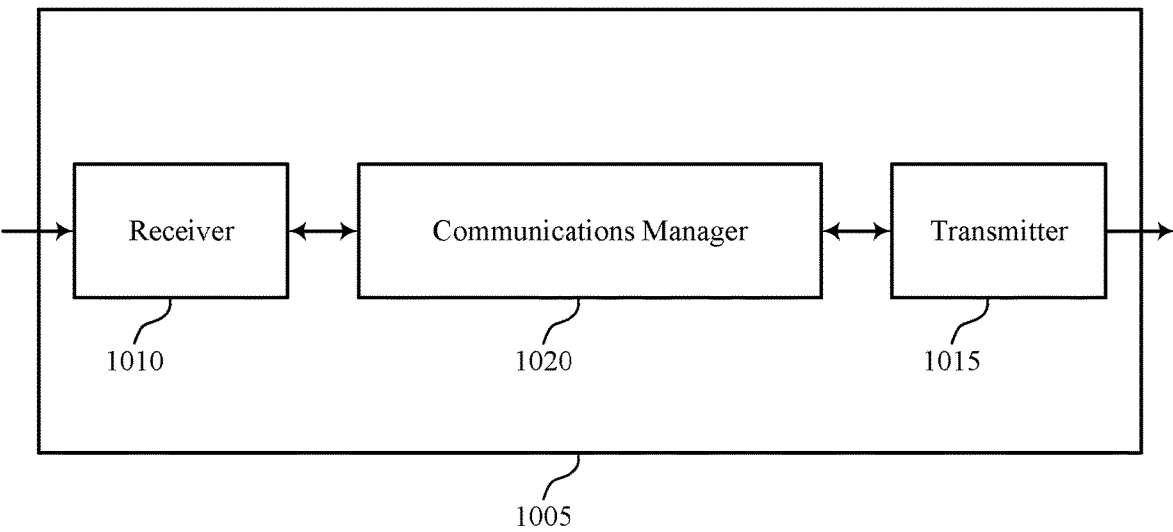
1010
1020
1015
1005
1000
FIG. 10

Figure 14:
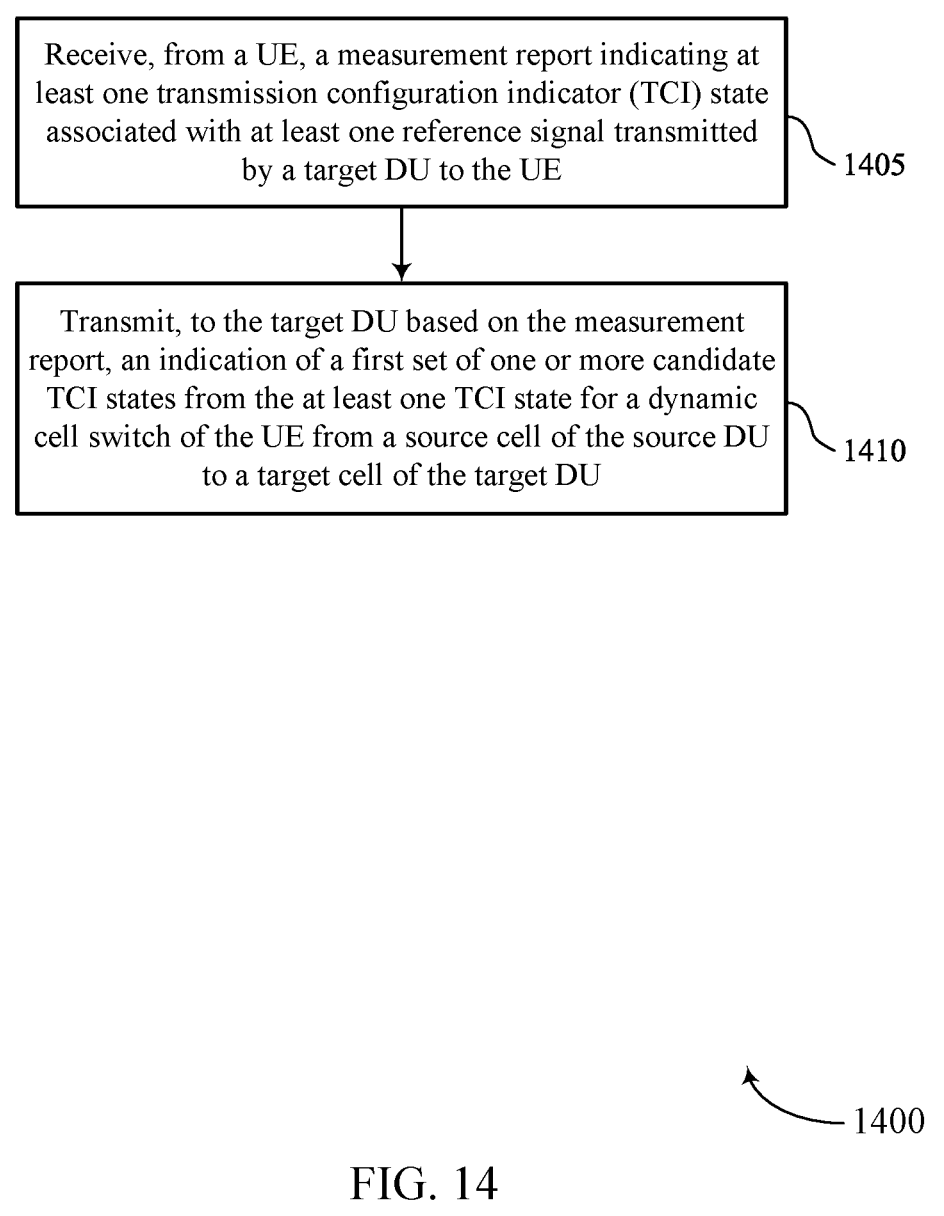

Receive, from a UE, a measurement report indicating at least one transmission configuration indicator (TCI) state associated with at least one reference signal transmitted by a target DU to the UE

1405

Transmit, to the target DU based on the measurement report, an indication of a first set of one or more candidate TCI states from the at least one TCI state for a dynamic cell switch of the UE from a source cell of the source DU to a target cell of the target DU

Transmit a set of multiple reference signals associated with a set of multiple transmission configuration indicator (TCI) states

1505

Receive, from a source DU, an indication of a first set of one or more candidate TCI states from the set of multiple TCI states for a dynamic cell switch of a UE from a source cell of the source DU to a target cell of the target DU

1510

1500

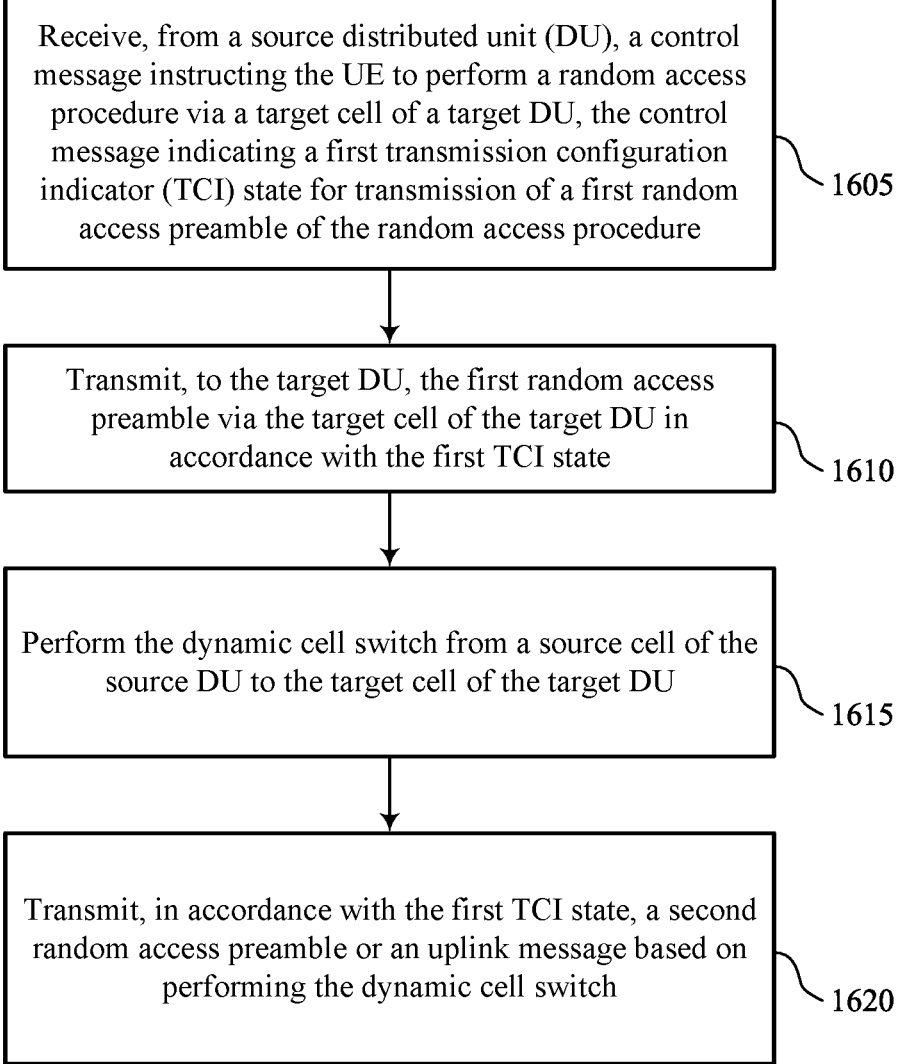

Receive, from a source distributed unit (DU), a control message instructing the UE to perform a random access procedure via a target cell of a target DU, the control message indicating a first transmission configuration indicator (TCI) state for transmission of a first random access preamble of the random access procedure ⟍ 1605

Transmit, to the target DU, the first random access preamble via the target cell of the target DU in accordance with the first TCI state ⟍ 1610

Perform the dynamic cell switch from a source cell of the source DU to the target cell of the target DU ⟍ 1615

Transmit, in accordance with the first TCI state, a second random access preamble or an uplink message based on performing the dynamic cell switch ⟍ 1620

TRANSMISSION CONFIGURATION INDICATOR STATE INDICATION FOR INTER-DISTRIBUTED UNIT LAYER 1/LAYER 2-TRIGGERED MOBILITY

CROSS REFERENCE

The present application for patent claims the benefit of U.S. Provisional Patent Application No. 63/496,634 by DAMNJANOVIC et al., entitled "TRANSMISSION CONFIGURATION INDICATOR STATE INDICATION FOR INTER-DISTRIBUTED UNIT LAYER 1/LAYER 2-TRIGGERED MOBILITY," filed Apr. 17, 2023, assigned to the assignee hereof, and expressly incorporated by reference herein.

FIELD OF TECHNOLOGY

The following relates to wireless communications, including transmission configuration indicator state (TCI) indication for inter-distributed unit (DU) layer 1 (L1)/layer 2 (L2)-triggered mobility (LTM).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support transmission configuration indicator (TCI) state indication for inter-distributed unit (DU) layer 1 (L1)/layer 2 (L2)-triggered mobility (LTM). Generally, the techniques described herein may enable a source DU to transmit, to a target DU, and indication of a set of candidate TCI states associated with a UE for potential use by the UE in an LTM cell switch. For example, the source DU may receive, from the UE, a measurement report indicating at least one TCI state associated with at least one reference signal transmitted by a target DU to the UE. As such, the source DU may select a set of one or more candidate TCI states from the at least one TCI state based on the measurement report and may transmit, to the target DU, an indication of the set of candidate TCI states for an LTM cell switch of the UE from a source cell of the source DU to a target cell of the target DU. In some examples, the indication of the set of candidate TCI states may further include an indication that the target DU is a candidate DU for the LTM cell switch. Additionally, in some cases, the source DU may transmit, to the UE, an LTM cell switch command instructing the UE to perform the LTM cell switch, where the LTM cell switch command indicates a first TCI state of the set of candidate TCI states for transmission of a random access message (e.g., for a random access channel (RACH)-based LTM cell switch) or an uplink message (e.g., for a RACH-less LTM cell switch) to the target DU via the target cell.

In some examples, the UE may perform an LTM random access procedure prior to receiving the LTM cell switch command. In other words, the UE may receive, from the source DU, a control message instructing the UE to perform the LTM random access procedure via the target cell of the target DU and indicating a second TCI state for transmission of a random access preamble of the LTM random access procedure. As such, the UE may transmit, to the target DU, the random access preamble in accordance with the second TCI state and initiate a timer based on transmitting the random access preamble. Additionally, the UE may receive the LTM cell switch command indicating for the UE to perform the LTM cell switch, as described previously. In some examples, the UE may receive the LTM cell switch command prior to expiration of the timer and may transmit the random access message or the uplink message in accordance with the second TCI state associated with the LTM random access procedure. Conversely, the UE may fail to receive the LTM cell switch command prior to expiration of the timer and may perform a random access procedure with the target cell of the target DU.

A method for wireless communications at a source DU is described. The method may include receiving, from a UE, a measurement report indicating at least one TCI state associated with at least one reference signal transmitted by a target DU to the UE, and transmitting, to the target DU based on the measurement report, an indication of a first set of one or more candidate TCI states from the at least one TCI state for a dynamic cell switch of the UE from a source cell of the source DU to a target cell of the target DU.

An apparatus for wireless communications at a source DU is described. The apparatus may include a processor, memory coupled with the processor, and instructions stored in the memory. The instructions may be executable by the processor to cause the apparatus to receive, from a UE, a measurement report indicating at least one TCI state associated with at least one reference signal transmitted by a target DU to the UE, and transmit, to the target DU based on the measurement report, an indication of a first set of one or more candidate TCI states from the at least one TCI state for a dynamic cell switch of the UE from a source cell of the source DU to a target cell of the target DU.

Another apparatus for wireless communications at a source DU is described. The apparatus may include means for receiving, from a UE, a measurement report indicating at least one TCI state associated with at least one reference signal transmitted by a target DU to the UE, and means for transmitting, to the target DU based on the measurement report, an indication of a first set of one or more candidate TCI states from the at least one TCI state for a dynamic cell switch of the UE from a source cell of the source DU to a target cell of the target DU.

A non-transitory computer-readable medium storing code for wireless communications at a source DU is described. The code may include instructions executable by a processor to receive, from a UE, a measurement report indicating at least one TCI state associated with at least one reference signal transmitted by a target DU to the UE, and transmit, to the target DU based on the measurement report, an indication of a first set of one or more candidate TCI states from the at least one TCI state for a dynamic cell switch of the UE from a source cell of the source DU to a target cell of the target DU.

Some examples of the method, apparatuses, and non-transitory computer-readable medium described herein may further include operations, features, means, or instructions for transmitting, to the UE, a dynamic cell switch command instructing the UE to perform the dynamic cell switch from the source cell of the source DU to the target cell of the target DU, the dynamic cell switch command indicating a first TCI state of the first set of one or more candidate TCI states for transmission of a random access preamble or an uplink message to the target DU via the target cell.

Some examples of the method, apparatuses, and non-transitory computer-readable medium described herein may further include operations, features, means, or instructions for receiving, from the target DU, a confirmation message indicating successful receipt of the indication of the first set of one or more candidate TCI states.

Some examples of the method, apparatuses, and non-transitory computer-readable medium described herein may further include operations, features, means, or instructions for transmitting, to the target DU, a second indication of a second set of one or more candidate TCI states for the dynamic cell switch of the UE from the source cell of the source DU to the target cell of the target DU.

Some examples of the method, apparatuses, and non-transitory computer-readable medium described herein may further include operations, features, means, or instructions for receiving, from the UE, a second measurement report indicating at least one second TCI state associated with at least one second reference signal transmitted by the target DU to the UE, where the second set of one or more candidate TCI states may be selected from the at least one second TCI state.

Some examples of the method, apparatuses, and non-transitory computer-readable medium described herein may further include operations, features, means, or instructions for receiving, from the target DU, a first control message indicating a resource allocation that identifies one or more resources reserved for the UE to perform the dynamic cell switch.

Some examples of the method, apparatuses, and non-transitory computer-readable medium described herein may further include operations, features, means, or instructions for transmitting, to the UE, a second control message indicating the resource allocation for the dynamic cell switch.

In some examples of the method, apparatuses, and non-transitory computer-readable medium described herein, the first control message indicates a mapping between each TCI state of the first set of one or more candidate TCI states and the one or more resources reserved for the UE.

Some examples of the method, apparatuses, and non-transitory computer-readable medium described herein may further include operations, features, means, or instructions for identifying, from a set of multiple target DUs, the target DU as a candidate for the dynamic cell switch.

Some examples of the method, apparatuses, and non-transitory computer-readable medium described herein may further include operations, features, means, or instructions for transmitting, to the target DU, a notification indicating that the target DU may be the candidate for the dynamic cell switch.

A method for wireless communications at a target DU is described. The method may include transmitting a set of multiple reference signals associated with a set of multiple TCI states, and receiving, from a source DU, an indication of a first set of one or more candidate TCI states from the set of multiple TCI states for a dynamic cell switch of a UE from a source cell of the source DU to a target cell of the target DU.

An apparatus for wireless communications at a target DU is described. The apparatus may include a processor, memory coupled with the processor, and instructions stored in the memory. The instructions may be executable by the processor to cause the apparatus to transmit a set of multiple reference signals associated with a set of multiple TCI states, and receive, from a source DU, an indication of a first set of one or more candidate TCI states from the set of multiple TCI states for a dynamic cell switch of a UE from a source cell of the source DU to a target cell of the target DUs.

Another apparatus for wireless communications at a target DU is described. The apparatus may include means for transmitting a set of multiple reference signals associated with a set of multiple TCI states, and means for receiving, from a source DU, an indication of a first set of one or more candidate TCI states from the set of multiple TCI states for a dynamic cell switch of a UE from a source cell of the source DU to a target cell of the target DU.

A non-transitory computer-readable medium storing code for wireless communications at a target DU is described. The code may include instructions executable by a processor to transmit a set of multiple reference signals associated with a set of multiple TCI states, and receive, from a source DU, an indication of a first set of one or more candidate TCI states from the set of multiple TCI states for a dynamic cell switch of a UE from a source cell of the source DU to a target cell of the target DU.

Some examples of the method, apparatuses, and non-transitory computer-readable medium described herein may further include operations, features, means, or instructions for receiving, from the UE, a random access message or an uplink message in accordance with a first TCI state of the first set of one or more candidate TCI states Some examples of the method, apparatuses, and non-transitory computer-readable medium described herein may further include operations, features, means, or instructions for transmitting, to the source DU, a confirmation message indicating successful receipt of the indication of the first set of one or more candidate TCI states.

Some examples of the method, apparatuses, and non-transitory computer-readable medium described herein may further include operations, features, means, or instructions for receiving, from the source DU, a second indication of a second set of one or more candidate TCI states for the dynamic cell switch of the UE from the source cell of the source DU to the target cell of the target DU.

Some examples of the method, apparatuses, and non-transitory computer-readable medium described herein may further include operations, features, means, or instructions for transmitting, a second set of multiple reference signals associated with a second set of multiple TCI states, where the second set of one or more candidate TCI states may be selected from the second set of multiple TCI states.

Some examples of the method, apparatuses, and non-transitory computer-readable medium described herein may further include operations, features, means, or instructions for transmitting a second set of multiple reference signals in accordance with each TCI state of the first set of one or more TCI states.

Some examples of the method, apparatuses, and non-transitory computer-readable medium described herein may further include operations, features, means, or instructions for transmitting, to the source DU, a control message indicating a resource allocation that identifies one or more resources reserved for the UE to perform the dynamic cell switch.

In some examples of the method, apparatuses, and non-transitory computer-readable medium described herein, the control message indicates a mapping between each TCI state of the first set of one or more candidate TCI states and the one or more resources reserved for the UE.

Some examples of the method, apparatuses, and non-transitory computer-readable medium described herein may further include operations, features, means, or instructions for receiving, from the source DU, a notification indicating that the target DU may be a candidate for the dynamic cell switch, where receiving the random access message or the uplink message may be based on the notification.

Some examples of the method, apparatuses, and non-transitory computer-readable medium described herein may further include operations, features, means, or instructions for monitoring for the random access message or the uplink message in accordance with the first TCI state based on receiving the notification.

A method for wireless communications at a UE is described. The method may include receiving, from a source DU, a control message instructing the UE to perform a random access procedure via a target cell of a target DU, the control message indicating a first TCI state for transmission of a first random access preamble of the random access procedure, transmitting, to the target DU, the first random access preamble via the target cell of the target DU in accordance with the first TCI state, performing a dynamic cell switch from a source cell of the source DU to the target cell of the target DU, and transmitting, in accordance with the first TCI state, a second random access preamble or an uplink message based on performing the dynamic cell switch.

An apparatus for wireless communications at a UE is described. The apparatus may include a processor, memory coupled with the processor, and instructions stored in the memory. The instructions may be executable by the processor to cause the apparatus to receive, from a source DU, a control message instructing the UE to perform a random access procedure via a target cell of a target DU, the control message indicating a first TCI state for transmission of a first random access preamble of the random access procedure, transmit, to the target DU, the first random access preamble via the target cell of the target DU in accordance with the first TCI state, perform a dynamic cell switch from a source cell of the source DU to the target cell of the target DU, and transmit, in accordance with the first TCI state, a second random access preamble or an uplink message based on performing the dynamic cell switch.

Another apparatus for wireless communications at a UE is described. The apparatus may include means for receiving, from a source DU, a control message instructing the UE to perform a random access procedure via a target cell of a target DU, the control message indicating a first TCI state for transmission of a first random access preamble of the random access procedure, means for transmitting, to the target DU, the first random access preamble via the target cell of the target DU in accordance with the first TCI state, means for performing a dynamic cell switch from a source cell of the source DU to the target cell of the target DU, and means for transmitting, in accordance with the first TCI state, a second random access preamble or an uplink message based on performing the dynamic cell switch.

A non-transitory computer-readable medium storing code for wireless communications at a UE is described. The code may include instructions executable by a processor to receive, from a source DU, a control message instructing the UE to perform a random access procedure via a target cell of a target DU, the control message indicating a first TCI state for transmission of a first random access preamble of the random access procedure, transmit, to the target DU, the first random access preamble via the target cell of the target DU in accordance with the first TCI state, perform a dynamic cell switch from a source cell of the source DU to the target cell of the target DU, and transmit, in accordance with the first TCI state, a second random access preamble or an uplink message based on performing the dynamic cell switch.

Some examples of the method, apparatuses, and non-transitory computer-readable medium described herein may further include operations, features, means, or instructions for receiving, from the source DU, a dynamic cell switch command instructing the UE to perform the dynamic cell switch from the source cell of the source DU to the target cell of the target DU, wherein the second random access preamble or the uplink message is transmitted based on a time duration between transmission of the first random access preamble and reception of the dynamic cell switch command satisfying a time threshold.

In some examples of the method, apparatuses, and non-transitory computer-readable medium described herein, the second random access preamble is transmitted based at least in part on the time duration exceeding the time threshold.

In some examples of the method, apparatuses, and non-transitory computer-readable medium described herein, the uplink message is transmitted based at least in part on the time duration failing to exceed the time threshold.

Some examples of the method, apparatuses, and non-transitory computer-readable medium described herein may further include operations, features, means, or instructions for receiving, from the target DU, a set of multiple reference signals associated with a set of multiple TCI states including at least the first TCI state.

Some examples of the method, apparatuses, and non-transitory computer-readable medium described herein may further include operations, features, means, or instructions for transmitting, to the source DU, a measurement report indicating at least the first TCI state associated with a first reference signal of the set of multiple reference signals.

Some examples of the method, apparatuses, and non-transitory computer-readable medium described herein may further include operations, features, means, or instructions for receiving, from the source DU, a second control message indicating a resource allocation that identifies one or more resources reserved for the UE to perform the dynamic cell switch.

In some examples of the method, apparatuses, and non-transitory computer-readable medium described herein, the second control message indicates a mapping between the first TCI state and at least one resource of the one or more resources reserved for the UE to perform the dynamic cell switch.

In some examples of the method, apparatuses, and non-transitory computer-readable medium described herein, the second random access preamble or the uplink message may be transmitted in the at least one resource corresponding to the first TCI state.

Some examples of the method, apparatuses, and non-transitory computer-readable medium described herein may further include operations, features, means, or instructions for initiating a timer based at least in part transmitting the first random access preamble, where expiration of the timer may be based on the time threshold.

In some examples of the method, apparatuses, and non-transitory computer-readable medium described herein, the UE transmits the second random access preamble based on the time duration exceeding the time threshold.

In some examples of the method, apparatuses, and non-transitory computer-readable medium described herein, the UE transmits the uplink message based on the time duration failing to exceed the time threshold.

BRIEF DESCRIPTION OF THE DRAWINGS

FIG. 4 shows an example of a process flow that supports TCI state indication for inter-DU LTM in accordance with one or more aspects of the present disclosure.

FIGS. 10 and 11 show block diagrams of devices that support TCI state indication for inter-DU LTM in accordance with one or more aspects of the present disclosure.

FIGS. 14 through 16 show flowcharts illustrating methods that support TCI state indication for inter-DU LTM in accordance with one or more aspects of the present disclosure.

DETAILED DESCRIPTION

Figure 1:
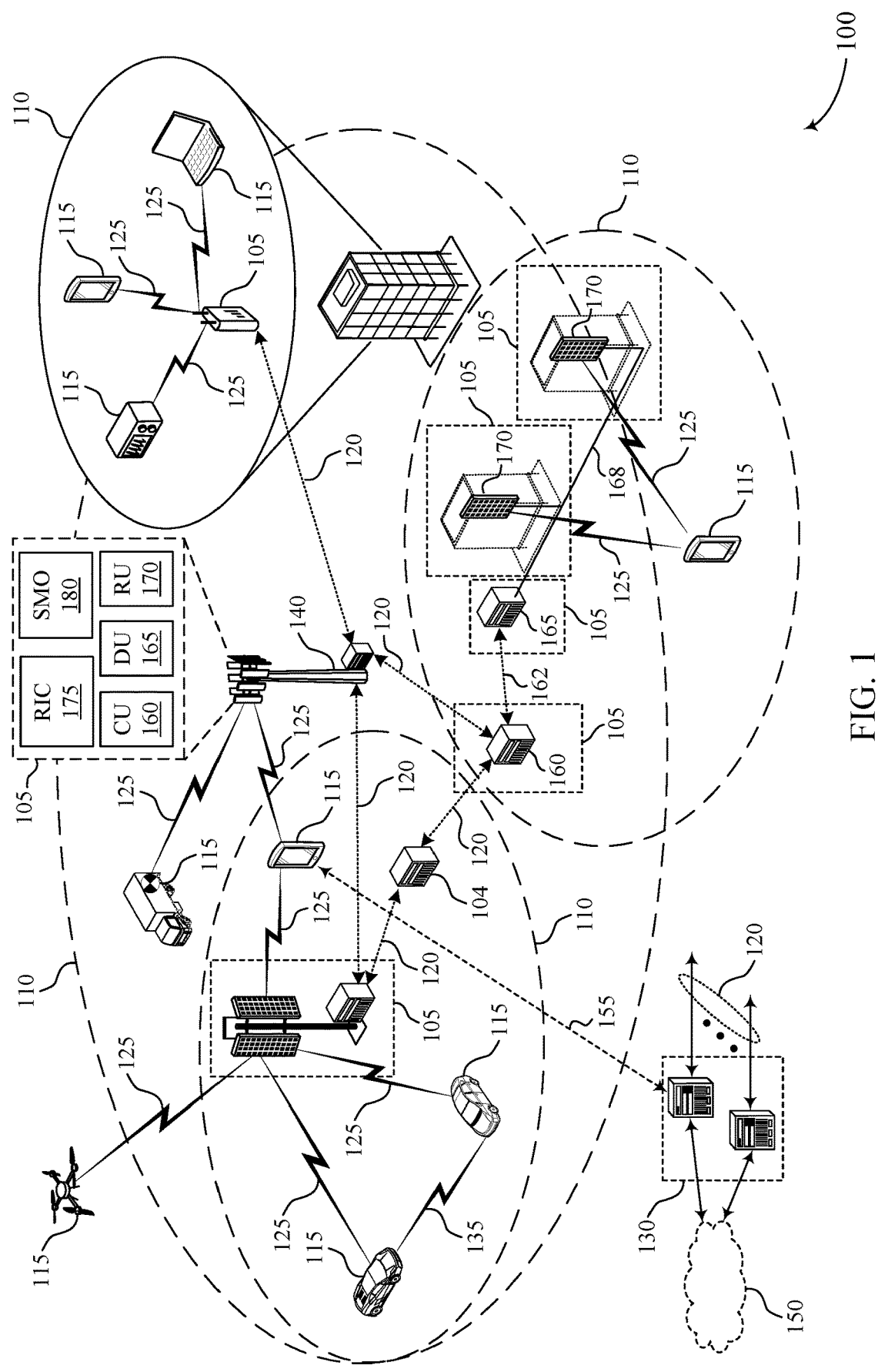
FIG. 1 shows an example of a wireless communications system that supports transmission configuration indicator state (TCI) indication for inter-distributed unit (DU) layer 1 (L1)/layer 2 (L2)-triggered mobility (LTM) in accordance with one or more aspects of the present disclosure.

Some wireless communications may support cell switching via the communication of layer 1 (L1)/layer 2 (L2) signaling, which may be referred to as L1/L2 triggered mobility (LTM). LTM may reduce a latency of cell switching relative to cell switching via the communication of layer 3 (L3) signaling (such as radio resource control (RRC) signaling), for example, as L1 and L2 signaling may be communicated with reduced latency relative to the communication of L3 signaling. In some examples, a source cell may indicate, to a UE, information associated with an LTM cell switch to be performed by the UE, such as an indication of a TCI state to be used by the UE to communicate with a target cell. However, in some examples, the source cell and the target cell may be associated with different distributed units (DUs), such as a source DU associated with the source cell and a target DU associated with the target cell, where the source DU and target DU communicate via a non-ideal backhaul. In such cases, the source DU may be unable to indicate the TCI state (e.g., to be used by the UE) to the target DU prior to the UE attempting to transmit communications to the target DU via the indicated TCI state, resulting in increased latency during LTM cell switching.

Accordingly, techniques described herein may enable a source DU to transmit, to a target DU prior to initiating an LTM cell switch, an indication of a set of candidate TCI states, such that the target DU may receive a random access message or an uplink message in accordance with a first TCI state of the set of TCI states. That is, a target cell of the target DU may transmit multiple reference signals to the UE and the UE may measure the multiple reference signals to determine at least one TCI state associated with at least one reference signal of the multiple reference signals to report to the source DU via a measurement report. As such, the source DU may select a set of candidate TCI states from the at least one TCI states based on the measurement report and may transmit, to the target DU, an indication of the set of candidate TCI states for an LTM cell switch of the UE from a source cell of the source DU to the target cell of the target DU. In some examples, the indication of the set of candidate TCI states may further include an indication that the target DU is a candidate DU for the LTM cell switch. Additionally, in some cases, the source DU may transmit, to the UE, an LTM cell switch command instructing the UE to perform the LTM cell switch, where the LTM cell switch command indicates a first TCI state from the set of candidate TCI states to be used by the UE. As such, the UE may transmit, to the target cell of the target DU, a random access message (e.g., for a random access channel (RACH)-based LTM cell switch) or an uplink message (e.g., for a RACH-less LTM cell switch) in accordance with the first TCI state.

In some examples, the UE may perform an LTM random access procedure prior to receiving the LTM cell switch command. In such cases, the UE may transmit a random access preamble of the LTM random access preamble in accordance with a second TCI state (e.g., indicated to the UE by the source DU) and may initiate a timer based on transmitting the random access preamble. In some cases, the UE may receive the LTM cell switch command prior to expiration of the timer and may transmit the random access message or the uplink message in accordance with the second TCI state associated with the LTM random access procedure. Conversely, the UE may fail to receive the LTM cell switch command prior to expiration of the timer and may perform a random access procedure with the target cell of the target DU.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to transmission configuration indicator state indication for inter-distributed unit layer 1/layer 2-triggered mobility.

FIG. 1 shows an example of a wireless communications system 100 that supports TCI state indication for inter-DU LTM in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a DU (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support TCI state indication for inter-DU LTM as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support techniques that enable a source DU 165 to transmit, to a target DU 165 prior to initiating an LTM cell switch, an indication of a set of candidate TCI states, such that the target DU 165 may receive a random access message or an uplink message in accordance with a first TCI state of the set of TCI states. That is, a target cell of the target DU 165 may transmit multiple reference signals to the UE 115 and the UE 115 may measure the multiple reference signals to determine at least one TCI state associated with at least one reference signal of the multiple reference signals to report to the source DU 165 via a measurement report. As such, the source DU 165 may select a set of candidate TCI states from the at least one TCI states based on the measurement report and may transmit, to the target DU 165, an indication of the set of candidate TCI states for an LTM cell switch of the UE 115 from a source cell of the source DU 165 to the target cell of the target DU 165. In some examples, the indication of the set of candidate TCI states may further include an indication that the target DU 165 is a candidate DU 165 for the LTM cell switch. Additionally, in some cases, the source DU 165 may transmit, to the UE 115, an LTM cell switch command instructing the UE 115 to perform the LTM cell switch, where the LTM cell switch command indicates a first TCI state from the set of candidate TCI states to be used by the UE 115. As such, the UE 115 may transmit, to the target cell of the target DU 165, a random access message (e.g., for a random access channel (RACH)-based LTM cell switch) or an uplink message (e.g., for a RACH-less LTM cell switch) in accordance with the first TCI state.

In some examples, the UE 115 may perform an LTM random access procedure prior to receiving the LTM cell switch command. In such cases, the UE 115 may transmit a random access preamble of the LTM random access preamble in accordance with a second TCI state (e.g., indicated to the UE 115 by the source DU 165) and may initiate a timer based on transmitting the random access preamble. In some cases, the UE 115 may receive the LTM cell switch command prior to expiration of the timer and may transmit the random access message or the uplink message in accordance with the second TCI state associated with the LTM random access procedure. Conversely, the UE 115 may fail to receive the LTM cell switch command prior to expiration of the timer and may perform a random access procedure with the target cell of the target DU 165.

Figure 2:
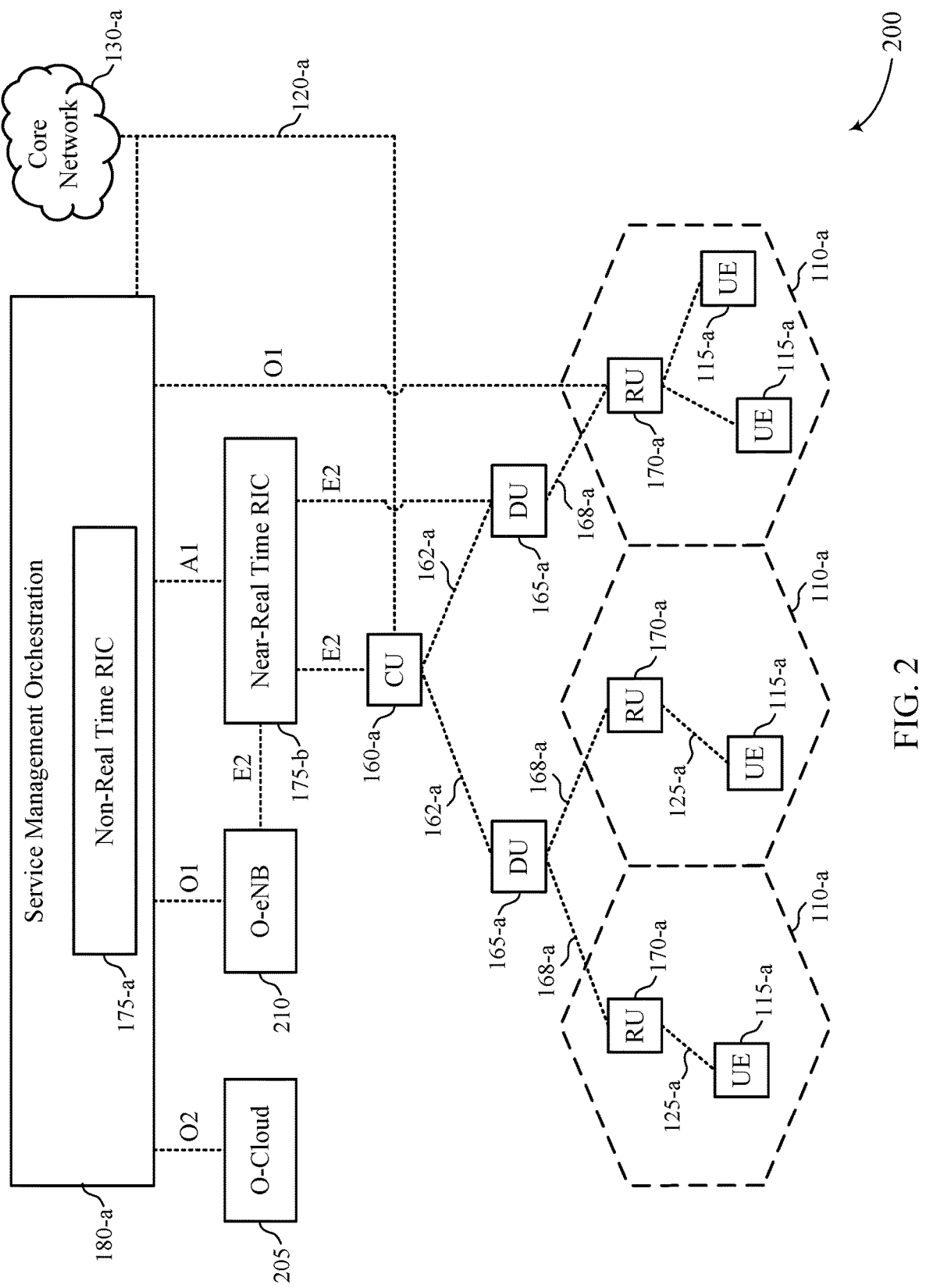
FIG. 2 shows an example of a network architecture that supports TCI state indication for inter-DU LTM in accordance with one or more aspects of the present disclosure.

FIG. 2 shows an example of a network architecture 200 (e.g., a disaggregated base station architecture, a disaggregated RAN architecture) that supports TCI state indication for inter-DU LTM in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface).

The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (IFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an A1 interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-a (e.g., reconfiguration via O1) or via generation of RAN management policies (e.g., A1 policies).

The network architecture 200 may support techniques that enable a source DU 165-a to transmit, to a target DU 165-a prior to initiating an LTM cell switch, an indication of a set of candidate TCI states, such that the target DU 165-a may receive a random access message or an uplink message in accordance with a first TCI state of the set of TCI states. That is, a target cell of the target DU 165-a may transmit multiple reference signals to the UE 115-a and the UE 115-a may measure the multiple reference signals to determine at least one TCI state associated with at least one reference signal of the multiple reference signals to report to the source DU 165-a via a measurement report. As such, the source DU 165-a may select a set of candidate TCI states from the at least one TCI states based on the measurement report and may transmit, to the target DU 165-a, an indication of the set of candidate TCI states for an LTM cell switch of the UE 115-a from a source cell of the source DU 165-a to the target cell of the target DU 165-a. In some examples, the indication of the set of candidate TCI states may further include an indication that the target DU 165-a is a candidate DU 165-a for the LTM cell switch. Additionally, in some cases, the source DU 165-a may transmit, to the UE 115-a, an LTM cell switch command instructing the UE 115-a to perform the LTM cell switch, where the LTM cell switch command indicates a first TCI state from the set of candidate TCI states to be used by the UE 115-a. As such, the UE 115-a may transmit, to the target cell of the target DU 165-a, a random access message (e.g., for a random access channel (RACH)-based LTM cell switch) or an uplink message (e.g., for a RACH-less LTM cell switch) in accordance with the first TCI state.

In some examples, the UE 115-a may perform an LTM random access procedure prior to receiving the LTM cell switch command. In such cases, the UE 115-a may transmit a random access preamble of the LTM random access procedure in accordance with a second TCI state (e.g., indicated to the UE 115-a by the source DU 165-a) and may initiate a timer based on transmitting the random access preamble. In some cases, the UE 115-a may receive the LTM cell switch command prior to expiration of the timer and may transmit the random access message or the uplink message in accordance with the second TCI state associated with the LTM random access procedure. Conversely, the UE 115-a may fail to receive the LTM cell switch command prior to expiration of the timer and may perform a random access procedure with the target cell of the target DU 165-a.

Figure 3:
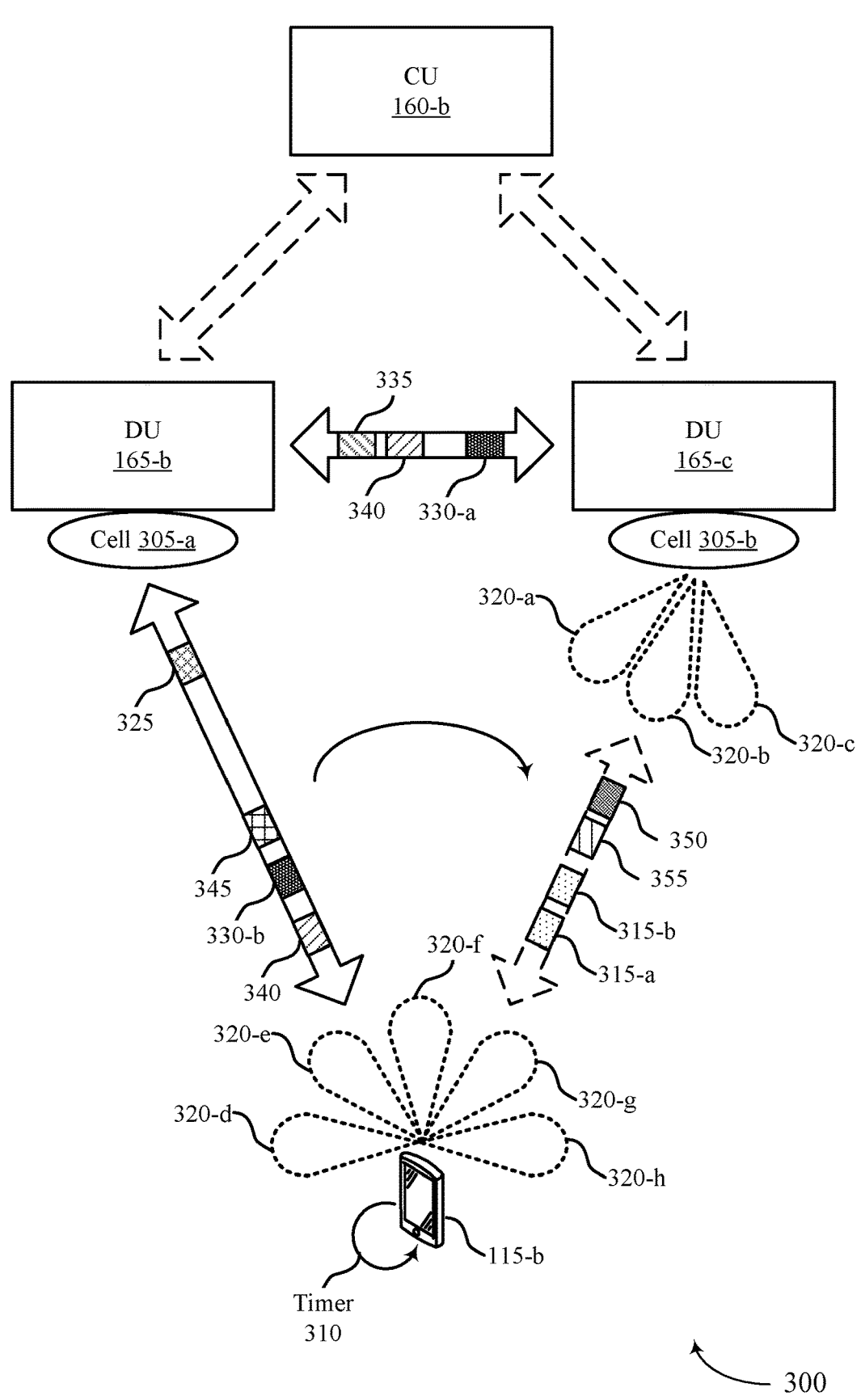
FIG. 3 shows an example of a wireless communications system that supports TCI state indication for inter-DU LTM in accordance with one or more aspects of the present disclosure.

FIG. 3 shows an example of a wireless communications system 300 that supports TCI state indication for inter-DU LTM in accordance with one or more aspects of the present disclosure. In some cases, the wireless communications system 300 may implement or be implemented by aspects of the wireless communications system 100 or the network architecture 200. For example, the wireless communications system 300 may include one or more UEs 115 (e.g., a UE 115-b) and one or more network entities 105, which may be examples of the corresponding devices as described with reference to FIG. 1. In the example of FIG. 3, the network entities 105 may be examples of a CU 160 (e.g., a CU 160-b), a DU 165 (e.g., such as a DU 165-b and a DU 165-c), an RU 170, a base station 140, an IAB node 104, or one or more other network nodes as described with reference to FIG. 1.

In some examples, the wireless communications system 300 may support cell switching via the communication of L1/L2 signaling, which may be referred to as LTM. LTM may reduce a latency of cell switching relative to cell switching via the communication of L3 signaling (such as RRC signaling), for example, as L1 and L2 signaling may be communicated with reduced latency relative to the communication of L3 signaling. In some examples, a source cell 305 may indicate, to the UE 115-b via a control message (e.g., an LTM MAC-CE), information associated with an LTM cell switch to be performed by the UE 115-b, such as an indication of one or more candidate target cells 305 (e.g., candidate configuration indices) to which the UE 115-b may switch. In some examples (e.g., intra-DU 165 cell switching), the one or more candidate target cells 305 may be associated with a same DU 165 as the source cell 305. In some other examples (e.g., inter-DU 165 cell switching), the one or more candidate target cells 305 may be associated with different DUs 165, such as a DU 165-*b* and a DU 165-*c*. In such cases, the DUs 165 may communication through a non-ideal backhaul (e.g., directly, via a single CU 160-*b* associated with both the DU 165-*b* and the DU 165-*c*, as depicted, or via multiple CUs 160, such as a first CU 160 associated with the DU 165-*b* and a second CU 160 associated with the DU 165-*c*).

Various RACH scenarios may be supported in association with the UE 115-*b* switching to a candidate target cell 305 of the one or more candidate target cells 305. For example, both RACH-based (e.g., contention free random access (CFRA), contention-based random access (CBRA)) and RACH-less procedures may be supported to perform a switch to the candidate target cell 305.

A RACH-based procedure may include a UE 115 performing a RACH procedure (e.g., a two-step RACH procedure, a four-step RACH procedure) with the candidate target cell 305 (e.g., a candidate target DU 165 via the candidate target cell 305) in response to receiving a command from a source, or serving, DU 165 to switch to the candidate target cell 305. The UE 115 may perform the RACH procedure to perform downlink synchronization with candidate target DU 165 via the candidate target cell 305 and/or obtain TA information associated with communicating (e.g., uplink communications) via the candidate target cell 305, among other purposes.

A RACH-less procedure may include the UE 115-*b* skipping performing the RACH procedure. Instead, TA information may be obtained (e.g., acquired) prior to switching to the candidate target cell 305 such that the UE 115-*b* may switch to the candidate target cell 305 without performing the RACH procedure. For example, cross-cell physical downlink control channel (PDCCH)-ordered RACH for early timing advance (TA) information acquisition may be performed before LTM triggering. For instance, a source DU 165 may transmit a PDCCH (e.g., a message via a PDCCH) indicating (e.g., ordering) for a UE 115 to transmit a RACH message (e.g., RACH preamble) to a candidate target DU 165 via the candidate target cell 305. The candidate target DU 165 may measure the RACH message to determine (e.g., compute, calculate) the TA information and the UE 115 may be indicated the TA information (e.g., from the source DU 165). Otherwise, the RACH-less procedure may be unsupported, as the UE 115 may not know what the TA information is.

In both a RACH-based procedure and a RACH-less procedure, the UE 115-*b* may perform the LTM cell switch in accordance with a timer. In other words, the UE 115-*b* may initiate a timer 310 based on transmitting a first uplink message of a RACH procedure or a first uplink message of a RACH-less procedure (e.g., an indication of a presence of the UE 115-*b*) and may monitor for a response from the candidate target DU 165. In some examples, the UE 115-*b* may receive the response prior to expiration of the timer and may continue with the RACH procedure or RACH-less procedure. Alternatively, the UE 115-*b* may fail to receive the response prior to expiration of the timer and may indicate, to the source DU 165, that the LTM cell switch procedure failed.

In some examples, the information associated with an LTM cell switch indicated via the control message (e.g., LTM MAC-CE) may further indicate a TCI state (e.g., beam) to be used by the UE 115-*b* to perform the LTM cell switch (e.g., to communicate with the candidate target cell

305). Additionally, when the source DU 165 and the target DU 165 are different DUs 165 (e.g., inter-DU cell switching), the source DU 165 may transmit an indication of the TCI state to the candidate target DU 165. However, in some cases, the candidate target DU 165 may not receive the indication prior to the UE 115-*b* transmitting a communication to the candidate target DU 165 (e.g., in a timely manner) due to the non-ideal backhaul between the source DU 165 and the candidate target DU 165 (e.g., due to backhaul latency), which may result in increased latency.

Accordingly, techniques described herein may enable a source DU 165, such as the DU 165-*b*, to transmit, to a candidate target DU 165, such as the DU 165-*c*, an indication of one or more candidate TCI states that the UE 115-*b* may to perform an LTM cell switch (e.g., may use to communicate with the DU 165-*c*). For example, the DU 165-*c* may transmit, via the cell 305-*b*, a set of reference signals 315-*a* for the UE 115-*b* to measure (e.g., perform an L1 measurement). The DU 165-*c* may transmit the set of reference signals 315-*a* via a set of beams 320, including a beam 320-*a*, a beam 320-*b*, and a beam 320-*c*, where each beam 320 is associated with a TCI state.

In some examples, the UE 115-*b* to may perform an intra-frequency L1 measurement of the set of reference signals 315-*a* (e.g., synchronization signal blocks (SSBs), where the SSBs may be transmitted using one or more of beams 320-*a*) transmitted by the cell 305-*b* (e.g., non-serving cell 305) associated with a target DU 165-*c*. In other words, the cell 305-*b* may be associated with a same SFN offset as the cell 305-*a*, an SSB of the cell 305-*b* may be associated with (e.g., covered by (an active bandwidth part (BWP) of the cell 305-*a* of the source DU 165-*b*, a reception timing difference (RTD) between reference signal transmissions from the cell 305-*a* and the set of reference signals 315-*a* from the cell 305-*b* may be less than a threshold (e.g., smaller than a length of a cyclic prefix (CP) of a corresponding subcarrier spacing (SCS)), or any combination thereof. In some examples, the UE 115-*b* may perform the intra-frequency L1 measurement of the set of reference signals 315-*a* when the RTD between the reference signal transmissions from the cell 305-*a* and the set of reference signals 315-*a* transmitted via cell 305-*b* (e.g., on a same carrier) exceeds the threshold (e.g., is larger than the length of the CP of the corresponding SCS) based on a capability of the UE 115-*b* (e.g., indicated to the DU 165-*b*, the DU 165-*c*, or both). Additionally, or alternatively, the UE 115-*b* may perform the intra-frequency L1 measurement of the set of reference signals 315-*a* when the cell 305-*a* and the cell 305-*b* are associated with different SFN offsets (e.g., SFN offsets are not aligned) based on the UE 115-*b* performing an L3 measurement before the L1 measurement. Additionally, or alternatively, the UE 115-*b* may perform the intra-frequency L1 measurement of the set of reference signals 315-*a* when the set of reference signals 315-*a* are not associated with the active BWP of the cell 305-*a* based on a capability of the UE 115-*b* (e.g., indicated to the DU 165-*b*, the DU 165-*c*, or both, via a control message or other control signaling). In some examples, for SSB based intra-frequency L1 measurement, the UE 115-*b* may signal a capability to perform such a measurement when a RTD between SSBs of a serving cell and a neighbor cell on the same carrier is larger than a CP length of the corresponding subcarrier spacing. In some examples, a UE may monitor an SSB for intra-frequency L1 measurement of a capability signaled to the source DU 165-*b*, the target DU 165-*c*, or both.

As such, the UE 115-*b* may receive the set of reference signals 315-*a* and may measure one or more quality metrics (e.g., reference signal receive power (RSRP)) associated with each reference signal 315-*a* of the set of reference signals 315-*a*. Additionally, the UE 115-*b* may transmit, to the DU 165-*b*, a measurement report 325 based on the one or more quality metrics. In some examples, the measurement report 325 may indicate the one or more quality metrics, a TCI state associated with each reference signal 315-*a*, or both. Additionally, or alternatively, the measurement report 325 may indicate a one or more TCI states associated with reference signals 315-*a* who's quality metrics exceed a threshold. Additionally, the DU 165-*b* may select a first set of candidate TCI states (e.g., one or more candidate TCI states) associated with the UE 115-*b* based on the measurement report 325. That is the UE 115-*b* may be associated with a quantity of TCI states (e.g., reported via the measurement report 325), where each TCI state of the quantity of TCI states is associated with a beam 320, such as a beam 320-*d*, a beam 320-*c*, a beam 320-*f*, a beam 20-*g*, and a beam 320-*h*, and the DU 165-*b* may select, from the quantity of TCI states, the first set of candidate TCI states (e.g., the first set may include a single TCI state or two or more TCI states). For example, the DU 165-*b* may select a first candidate TCI state associated with the beam 320-*f* and a second candidate TCI state associated with the beam 320-*g*. As such, the DU 165-*b* may transmit, to the DU 165-*b*, a control message 330-*a* indicating the first set of candidate TCI states associated with the UE 115-*b* (e.g., via a backhaul link).

In some examples, the control message 330-*a* (e.g., or an additional control message 330) may indicate that the DU 165-*c* is a candidate DU 165 for the LTM cell switch to be performed by the UE 115-*b* (e.g., indicate for the DU 165-*c* to start expecting communications form the UE 115-*b*). That is, the DU 165-*b* may identify a set of one or more candidate DUs 165 (e.g., DUs 165 deemed as good candidates for cell switch of the UE from the source DU 16-*b* to a candidate target DU so that backhaul communications are reduced or minimized by omitting signaling to other potential target DUs that are unlikely candidates for cell switch) from a quantity of DUs 165 in communication with the DU 165-*b* and transmit the control message 330-*a* (e.g., or the additional control message 330) to each DU 165 of the set of candidate DUs 165. In an example, the source DU 165-*a* may proactively notify (e.g., via a notification message sent via a backhaul link) one or more candidate target DU(s) of a potentially upcoming LTM and provides the candidate TCI state(s) to the candidate target DU(s) (e.g., based on a trajectory of the UE). This notification may be done only for the subset of target DUs and corresponding target cells, that are deemed as good candidates so that the backhaul communication is reduced minimized. In some examples, the notification message may indicate for the one or more candidate target DU(s) to start reservation of resources configured for the UE (e.g., SR resources, SRS resources, CG resources) for the UE to access the one or more candidate target DU(s) (e.g., start expecting the UE, instead of using those resources for other purposes).

In some examples, the DU 165-*c* may transmit, to the DU 165-*b*, a confirmation message 335 indicating successful receipt of the control message 330-*a*. Additionally, or alternatively, the DU 165-*c* may transmit, to the DU 165-*b*, a resource allocation 340 indicating one or more resources reserved for the UE 115-*b* to perform the LTM cell switch (e.g., reserved for the UE 115-*b* to access the DU 165-*c*). In some examples, the resource allocation 340 may indicate a mapping between each TCI state of the set first set of candidate TCI states and the one or more resources reserved for the UE 115-*b* (e.g., as given by an RRC configuration). In other words, each TCI state of the first set of candidate TCI states may be mapped (e.g., linked) to at least one resource of the one or more resources. In some examples, the DU 165-*c* may reserve the one or more resources for the UE 115-*b* based on receiving the receiving the indication that the DU 165-*c* is a candidate DU 165 for the LTM cell switch. In some examples, the DU 165-*c* may transmit a set of reference signals 315-*b* (e.g., scheduling request (SRs), sounding reference signals (SRSs), configured grants (CGs)) to the UE 115-*b* via the one or more resources allocated to the UE 115-*b* in accordance with the first set of candidate TCI states (e.g., may sweep the first set of candidate TCI states on the one or more resources configured for the UE 115-*b*). Additionally, the DU 165-*b* may transmit (e.g., forward), to the UE 115-*b*, the resource allocation 340.

In some examples, the DU 165-*b* may transmit, to the UE 115-*b*, an LTM cell switch command 345 (e.g., LTM MAC CE) indicating a first TCI state from the first set of candidate TCI states. As such, the UE 115-*b* may transmit, to the DU 165-*c* via the cell 305-*b*, an uplink message 350 (e.g., for RACH-less cell switching) or a random access message 355 (e.g., for RACH-based cell switching) in accordance with the first TCI state (e.g., via a beam 320 associated with the first TCI state).

Additionally, or alternatively, the UE 115-*b* may perform conditional LTM cell switch. That is, the UE 115-*b* may identify (e.g., via dynamic configuration, pre-configuration, or both) one or more conditions associated with performing LTM cell switch. Thus, the UE 115-*b* may identify when at least one condition of the one or more conditions is satisfied and may perform the LTM cell switch based on satisfaction of the at least one condition. In other words, the UE 115-*b* may transmit, to the DU 165-*c* via the cell 305-*b*, an uplink message 350 (e.g., for RACH-less cell switching) or a random access message 355 (e.g., for RACH-based cell switching) based on satisfaction of the at least one condition.

In some examples, the DU 165-*b* may update the first set of candidate TCI states. For example, the DU 165-*c* may transmit a second set of reference signals 315-*a* and the UE 115-*b* may transmit, to the DU 165-*b*, a second measurement report 325 based on the second set of reference signals 315-*a*. As such, the DU 165-*b* may identify a second set of candidate TCI states and may transmit, to the DU 165-*c*, a second control message 330-*a* indicating the second set of candidate TCI states. In such case, the DU 165-*b* may transmit the second set of candidate TCI states based on a best TCI state candidate (e.g., associated with a greatest signal metric) not being in the first set of candidate TCI states, a threshold quantity of best TCI state candidates not being in the first set of TCI states, at least one of the best TCI state candidates not being in the first set of TCI states, or any combination thereof.

In some examples, the DU 165-*b* may not transmit an indication of the first TCI state from the set of candidate TCI states to the DU 165-*c* at the time at which the DU 165-*b* transmits the LTM cell switch command 345 (e.g., the first TCI state may not be in the set of candidate TCI states indicated to the DU 165-*c* or the control message 330-*a* may not be received by the DU 165-*c*). In such case, the DU 165-*b* may indicate, to the UE 115-*b*, for the UE to perform a RACH procedure (e.g., a contention free (CF) RACH procedure) with the DU 165-*c*. In such cases, the DU 165-*b* may transmit the indication to perform the RACH procedure in the LTM cell switch command 345 (e.g., explicitly indicating to perform the RACH procedure). Alternatively, the DU 165-*b* may indicate for the UE 115-*b* to perform the RACH procedure based on omitting (e.g., excluding) an indication of the first TCI state in the LTM cell switch command 345.

In some examples, the target DU 165-*c* may expect the UE 115-*b* to use a TCI state that the UE 115-*b* used for a last LTM RACH (e.g., for the purpose of TA update) when performing a dynamic cell switch. To maintain accuracy, a source DU 165-*b* may proactively instruct the UE 115-*b* to perform a LTM RACH procedure with one or more target candidate DUs before a potential cell switch to one of the target DUs via a corresponding target cell (e.g., cell 305-*b*). For example, the UE 115-*b* may perform an LTM RACH procedure (e.g., in response to a control message received from source DU 165-*b*) prior to reception of the LTM cell switch command 345 (e.g., to maintain accuracy) to performing a dynamic cell switch to the target DU 165-*c*. The LTM RACH may be used to identify a TCI state (e.g., best beam) and a TA for the target DU 165-*c*, each of which the UE 115-*b* reports to the source DU 165-*b*. The UE 115-*b* may use that TCI state when transmitting a RACH preamble transmission to the target DU 165-*c* via the target cell 305-*b* to determine the TA for the target cell 305-*b*. When subsequently performing the dynamic cell switch, the source DU 165-*b* may transmit an LTM switch command that indicates whether the UE 115-*b* is to use the same TCI state determined for the target DU 165-*c* during the prior LTM RACH procedure, or to perform a new RACH procedure with target DU 165-*c*.

In some cases, the UE 115-*b* may initiate a timer to determine whether to use the same TCI determined for the target DU 165-*c* during the prior LTM RACH procedure, or to perform a new RACH procedure with target DU 165-*c*. In some examples, signaling from the source DU 165-*c* may specify the value of the timer. The UE 115-*b* may initiate the timer at the time the UE 115-*b* transmitted the RACH preamble transmission, using a transmission beam corresponding to the TCI state, to the target DU 165-*c* via the target cell 305-*b*. If the timer is running when the LTM switch command (e.g., LTM MAC CE) is received, the UE 115-*b* may use that same TCI state to transmit a subsequent RACH preamble transmission to the target DU 165-*c* when performing the dynamic cell switch. If, however, the timer expired, the UE 115-*b* may perform a new RACH procedure with the target cell 305-*b* of the target DU 165-*c*. For example, the new RACH procedure may involve the UE 115-*b* monitoring SSB transmissions by the source target DU 165-*b* via the target cell 305-*b* via a set of different transmission beams that corresponding to a set of TCI states. The UE 115-*b* may identify one of the transmission beams (e.g., corresponding to a highest RSRP measurement), and may transmit a RACH preamble message in a random access occasion that corresponding to that transmission beam to initiate a RACH procedure with the target DU 165-*b* for the dynamic cell switch.

In some examples, the DU 165-*b* may transmit, to the UE 115-*b*, a control message 330-*b* indicating for the UE 115-*b* to perform the LTM RACH via the cell 305-*b* of the DU 165-*c* (e.g., to obtain a TA associated with the target DU 165-*c*). In such cases, the control message 330-*b* may indicate a second TCI state for transmission of a first RACH preamble (e.g., random access preamble) of the LTM RACH. As such, the UE 115-*b* may transmit the first RACH preamble to the cell 305-*b* of the DU 165-*c* in accordance with the second TCI state (e.g., via a beam 320 associated with the second TCI state) and may initiate a timer based on transmitting the first RACH preamble. In such cases, the DU 165-*c* may identify the UE 115-*b* (e.g., performing the LTM RACH) to enable the DU 165-*c* to map the first set of candidate TCI states (e.g., or second set of candidate TCI states) to the one or more resources allocated to the UE 115-*b*. In some cases, the DU 165-*b* may transmit the LTM cell switch command 345 prior to expiration of the timer. In such cases, the UE 115-*b* may transmit the uplink message 350 or the random access message 355 (e.g., RACH preamble) via the second TCI state used to transmit the first RACH preamble. Alternatively, the DU 165-*b* may transmit the LTM cell switch command 345 after expiration of the timer. In such cases, the UE 115-*b* may perform a RACH procedure at the DU 165-*c*. In other words, the LTM cell switch command 345 may indicate whether the UE 115-*b* may use the second TCI state (e.g., used for transmission of the first RACH preamble) to perform the LTM cell switch or whether the UE 115-*b* may perform a RACH procedure with the DU 165-*c*.

Though described in the context of a single candidate target DU 165 (e.g., the DU 165-*c*) associated with a single cell 305 (e.g., the cell 305-*b*), this is not to be regarded as a limitation of the present disclosure. In this regard, any quantity of candidate target DUs 165 associated with any quantity of cells 305 may be considered with regards to the techniques described herein. Additionally, or alternatively, though depicted in the context of the CU 160-*b* associated with both DUs 165, this is not to be regarded as a limitation of the present disclosure. In this regard, the DU 165-*b* and the DU 165-*c* may be associated with a same CU 160 (e.g., the CU 160-*b*) or different CUs 160 (e.g., a first CU 160 associated with the DU 165-*b* and a second CU 160 associated with the DU 165-*c*).

Figure 4:
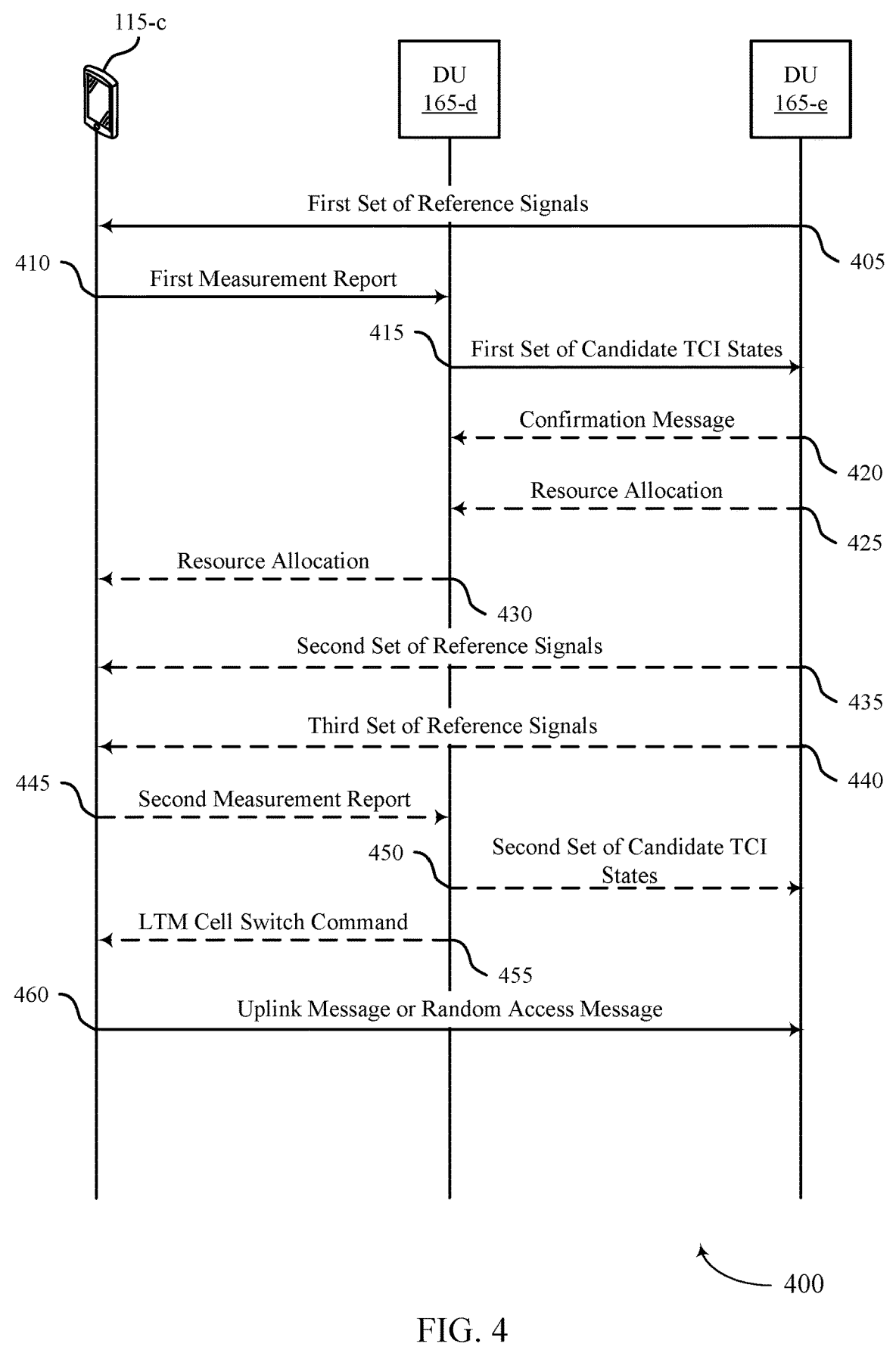

FIG. 4 shows an example of a process flow 400 that supports TCI state indication for inter-DU LTM in accordance with one or more aspects of the present disclosure. In some cases, the process flow 400 may implement or be implemented by aspects of the wireless communications system 100, the network architecture 200, or the wireless communications system 300. For example, the process flow 400 may include one or more UEs 115 (e.g., a UE 115-*c*) and one or more network entities 105, which may be examples of the corresponding devices as described with reference to FIG. 1. In the example of FIG. 4, the network entities 105 may be examples of a CU 160, a DU 165 (e.g., such as a DU 165-*d* and a DU 165-*e*), an RU 170, a base station 140, an IAB node 104, or one or more other network nodes as described with reference to FIG. 1.

At 405, the DU 165-*e* (e.g., a target DU 165) may transmit, to the UE 115-*c*, a first set of reference signals associated with multiple TCI states. For example, the DU 165-*e* may transmit a set of SSBs in a set of SSB time occasions, where each SSB is transmitted using a respective transmission beam corresponding to one of the TCI states.

At 410, the UE 115-*c* may measure the first set of reference signals and transmit, to the DU 165-*d* (e.g., a source DU 165) a first measurement report indicating at least one TCI state (e.g., from the multiple TCI states) associated with at least one reference signal (e.g., from the first set of reference signals) transmitted by the DU 165-*e* to the UE 115-*c*. In some examples, the UE 115-*c* may indicate one or measurements corresponding to the at least one TCI state (e.g., an RSRP measurement corresponding to a TCI state).

At 415, the DU 165-*d* may transmit, to the DU 165-*e* based on the first measurement report, an indication of a first set of candidate TCI states (e.g., a first set of one or more candidate TCI states) from the at least one TCI state for an LTM cell switch (e.g., dynamic cell switch) of the UE 115-*c* from a source cell of the DU 165-*d* to a target cell of the DU 165-e. In some examples, the indication of the first set of candidate TCI states may further include a notification indicating that the DU 165-e is a candidate for the LTM cell switch (e.g., based on the DU 165-d identifying, from multiple target DUs 165, the DU 165-e as a candidate for the LTM cell switch).

In some cases, at 420, the DU 165-e may transmit, to the DU 165-d, a confirmation message indicating successful receipt of the indication of the first set of candidate TCI states.

In some examples, at 425, the DU 165-e may transmit, to the DU 165-d, a control message indicating a resource allocation that identifies one or more resources reserved for the UE 115-c to perform the LTM cell switch, The control message may further indicate a mapping between each TCI state of the first set of candidate TCI states and the one or more resources reserved for the UE 115-c. As such at 430, the DU 165-d may transmit (e.g., forward) the resource allocation (e.g., and mapping) to the UE 115-c.

In some examples, at 435, the DU 165-e may transmit a second set of reference signals in accordance with each TCI state of the first set of candidate TCI states via the one or more resources reserved for the UE 115-c (e.g., perform a beam sweep of the second set of reference signals that includes on or more TCI states of the first set)

In some examples, at 440, the DU 165-e may transmit, to the UE 115-c, a third set of reference signals associated with multiple second TCI states (e.g., the same as or different than the multiple TCI states associated with the first set of reference signals).

As such, at 445, the UE 115-c may transmit, to the DU 165-e, a second measurement report indicating at least one second TCI state (e.g., from the multiple second TCI states) associated with at least one reference signal (e.g., from the second set of reference signals) transmitted by the DU 165-e to the UE 115-c.

In such cases, at 450, the DU 165-d may update the first set of candidate TCI states to a second set of candidate TCI states. In other words, the DU 165-d may transmit, to the DU 165-e, an indication of a second set of candidate TCI states (e.g., a second set of one or more candidate states) from the at least one second TCI state for an LTM cell switch (e.g., dynamic cell switch) of the UE 115-c from the source cell of the DU 165-d to the target cell of the DU 165-e.

In some cases, at 455, the DU 165-d may transmit, to the UE 115-c, an LTM cell switch command (e.g., dynamic cell switch command) instructing the UE 115-c to perform the LTM cell switch from the source cell of the DU 165-d to the target cell of the DU 165-e. In such cases, the LTM cell switch command may indicate a first TCI state of the first set of candidate TCI states (e.g., or a second TCI state from the second set of candidate TCI states) from transmission of a random access message or an uplink message to the DU 165-e via the target cell.

As such, at 460, the DU 165-e may monitor for the random access message or the uplink message from the UE 115-c and the UE 115-c may transmit, to the DU 165-e, the random access message or the uplink message in accordance with the first TCI state of the first set of candidate TCI states (e.g., or the second TCI state from the second set of candidate TCI states). In some examples, the UE 115-c and the target DU 165-e may establish connectivity (e.g., successfully complete the RACH procedure to initiate a wireless connection). and subsequently communicate one or more uplink messages, one or more downlink messages, or both.

Figure 5:
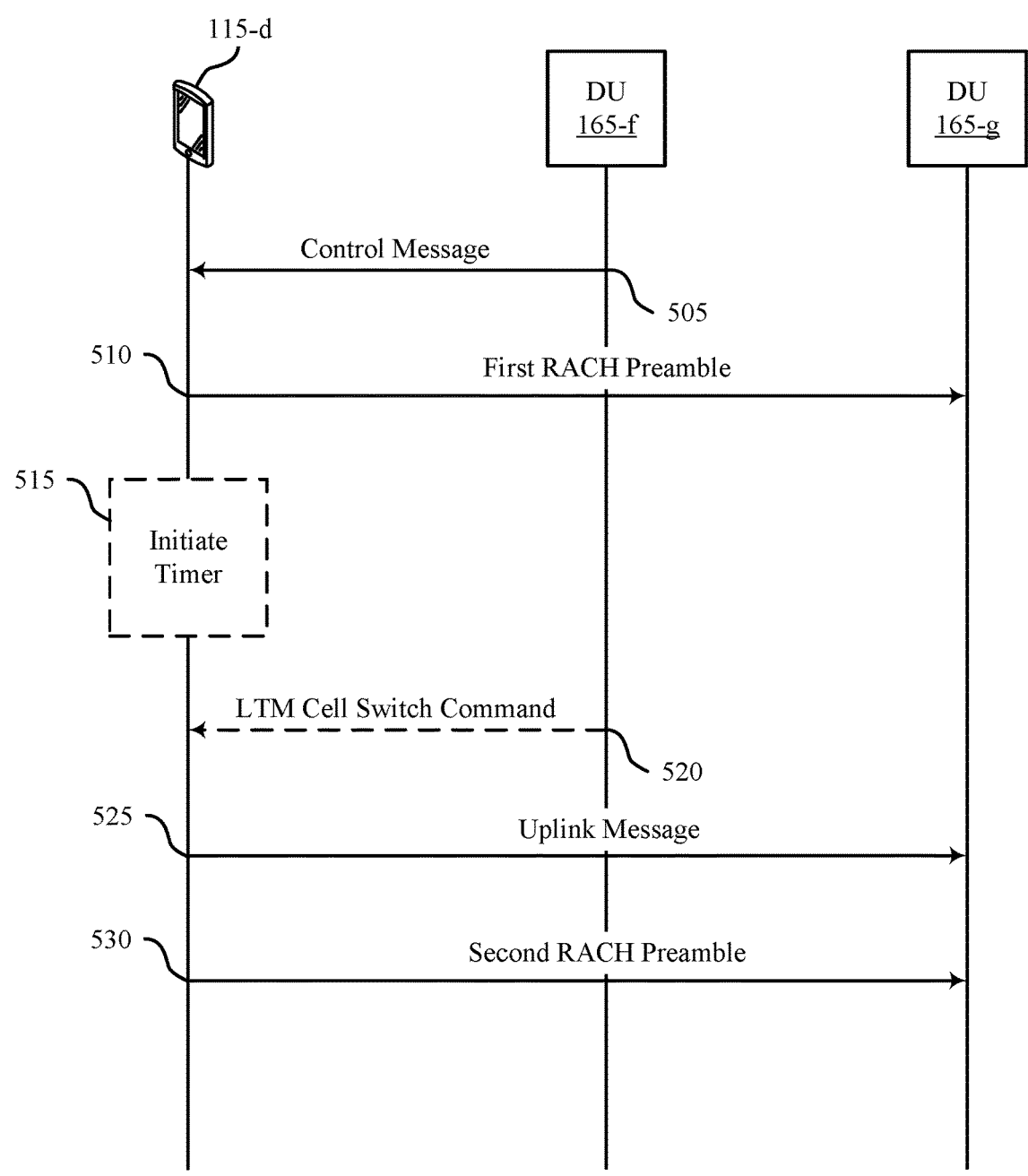
FIG. 5 shows an example of a process flow that supports TCI state indication for inter-DU LTM in accordance with one or more aspects of the present disclosure.

FIG. 5 shows an example of a process flow 500 that supports TCI state indication for inter-DU LTM in accordance with one or more aspects of the present disclosure. In some cases, the process flow 500 may implement or be implemented by aspects of the wireless communications system 100, the network architecture 200, the wireless communications system 300, or the process flow 500. For example, the process flow 500 may include one or more UEs 115 (e.g., a UE 115-d) and one or more network entities 105, which may be examples of the corresponding devices as described with reference to FIG. 1. In the example of FIG. 5, the network entities 105 may be examples of a CU 160, a DU 165 (e.g., such as a DU 165-f and a DU 165-g), an RU 170, a base station 140, an IAB node 104, or one or more other network nodes as described with reference to FIG. 1.

At 505, the UE 115-d may receive, from the DU 165-f (e.g., a source DU 165), a control message instructing the UE 115-d to perform an LTM RACH procedure (e.g., random access procedure) via a target cell of the DU 165-g. The UE 115-d may monitor reference signal transmissions of the DU 165-g to determine a first TCI state for transmission of a first RACH preamble (e.g., random access preamble) of the LTM RACH procedure.

At 510, the UE 115-d may transmit, to the DU 165-g via the target cell, the first RACH preamble in accordance with the first TCI state based on receiving the control message. In such scenarios, the target DU 165-g may expect that same first TCI state to be used during a subsequent dynamic cell switch.

In some cases, at 515, the UE 115-d may initiate a timer based on transmitting the first RACH preamble. In such cases, a duration of the timer may be based on a time threshold, which may be set by the UE 115-b or configured by the source or target Dus via control signaling.

In some cases, at 520, the UE 115-d may receive, from the DU 165-f, an LTM cell switch command (e.g., dynamic cell switch command) instructing for the UE 115-d to perform the LTM cell switch from a source cell of the DU 165-f to the target cell of the DU 165-g.

In some examples, the UE 115-d may receive the LTM cell switch command prior to expiration of the timer (e.g., satisfying the time threshold, failing to exceed the time threshold), such that, at 525, the UE 115-d may transmit, to the DU 165-g, an uplink message in accordance with the first TCI state. In other words, the UE 115-d may transmit the uplink message (e.g., perform the LTM cell switch) using a transmission beam in accordance with the first TCI state used to transmit the first RACH preamble based on the LTM cell switch command being received prior to expiration of the timer.

In some other examples, the UE 115-d may receive the LTM cell switch command after expiration of the timer (e.g., failing to satisfy the time threshold, exceeding the time threshold), such that, at 530, the UE 115-d may transmit, to the DU 165-g, a second RACH preamble that may differ from the first TCI state. In other words, the UE 115-d may perform a new RACH procedure with (e.g., at) the DU 165-g based on the LTM cell switch command being received after expiration of the timer. For example, if the timer expired before receipt of the LTM cell switch command, the UE 115-d may perform a new RACH procedure with a target cell of the target DU 165-e. For example, the new RACH procedure may involve the UE 115-c monitoring SSB transmissions by the source target DU 165-f via the target cell via a set of different transmission beams that corresponding to a set of TCI states. The UE 115-b may identify a second TCI state corresponding to one of the transmission beams (e.g., corresponding to a highest RSRP measurement), and may transmit the second RACH preamble message in a random access occasion that corresponding to that transmission beam in accordance with the second TCI to initiate a RACH procedure with the target DU 165-e for the dynamic cell switch. In some cases, the second TCI state may be the same as the first TCI state, or may differ from the first TCI state. In some examples, the UE 115-d and the target DU 165-g may establish connectivity (e.g., successfully complete the RACH procedure to initiate a wireless connection). and subsequently communicate one or more uplink messages, one or more downlink messages, or both.

Figure 6:
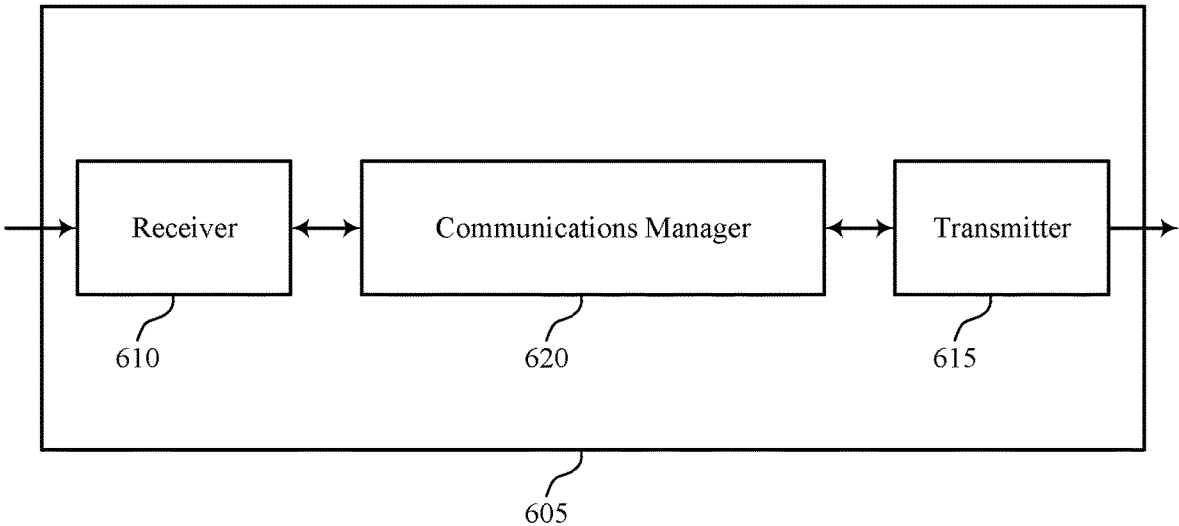
FIGS. 6 and 7 show block diagrams of devices that support TCI state indication for inter-DU LTM in accordance with one or more aspects of the present disclosure.

FIG. 6 shows a block diagram 600 of a device 605 that supports TCI state indication for inter-DU LTM in accordance with one or more aspects of the present disclosure. The device 605 may be an example of aspects of a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of TCI state indication for inter-DU LTM as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a source DU (DU) in accordance with examples as disclosed herein. For example, the communications manager 620 is capable of, configured to, or operable to support a means for receiving, from a UE, a measurement report indicating at least one TCI (TCI) state associated with at least one reference signal transmitted by a target DU to the UE. The communications manager 620 is capable of, configured to, or operable to support a means for transmitting, to the target DU based on the measurement report, an indication of a first set of one or more candidate TCI states from the at least one TCI state for a dynamic cell switch of the UE from a source cell of the source DU to a target cell of the target DU. The communications manager 620 is capable of, configured to, or operable to support a means for transmitting, to the UE, a dynamic cell switch command instructing the UE to perform the dynamic cell switch from the source cell of the source DU to the target cell of the target DU, the dynamic cell switch command indicating a first TCI state of the first set of one or more candidate TCI states for transmission of a random access message or an uplink message to the target DU via the target cell.

Additionally, or alternatively, the communications manager 620 may support wireless communications at a target DU (DU) in accordance with examples as disclosed herein. For example, the communications manager 620 is capable of, configured to, or operable to support a means for transmitting a set of multiple reference signals associated with a set of multiple TCI (TCI) states. The communications manager 620 is capable of, configured to, or operable to support a means for receiving, from a source DU, an indication of a first set of one or more candidate TCI states from the set of multiple TCI states for a dynamic cell switch of a UE from a source cell of the source DU to a target cell of the target DU. The communications manager 620 is capable of, configured to, or operable to support a means for receiving, from the UE, a random access message or an uplink message in accordance with a first TCI state of the first set of one or more candidate TCI states.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for TCI state indication for inter-DU LTM which may result in reduced processing, reduced power consumption, and more efficient utilization of communication resources, among other advantages.

Figure 7:
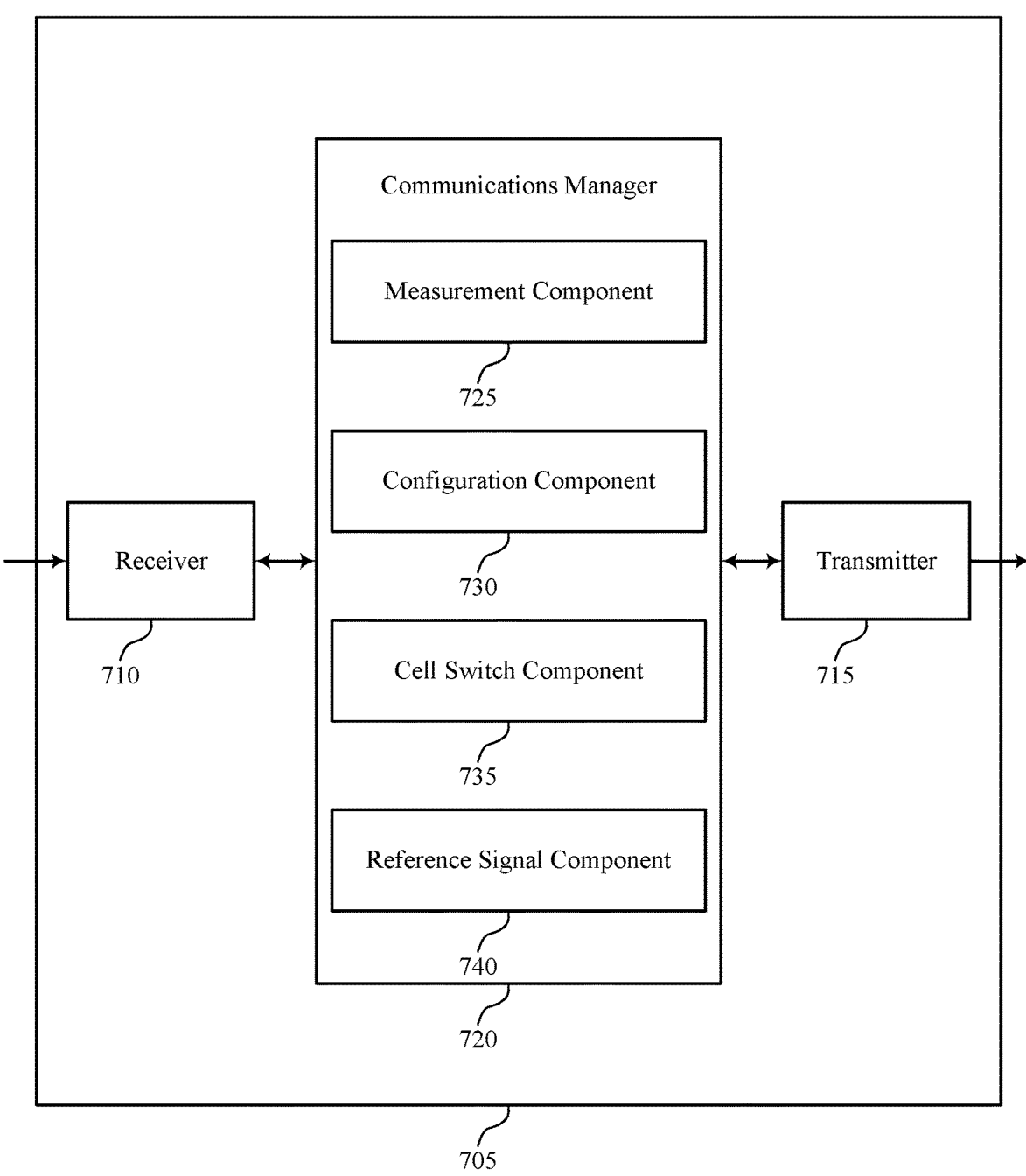

FIG. 7 shows a block diagram 700 of a device 705 that supports TCI state indication for inter-DU LTM in accordance with one or more aspects of the present disclosure. The device 705 may be an example of aspects of a device 605 or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of TCI state indication for inter-DU LTM as described herein. For example, the communications manager 720 may include a measurement component 725, a configuration component 730, a cell switch component 735, a reference signal component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a source DU (DU) in accordance with examples as disclosed herein. The measurement component 725 is capable of, configured to, or operable to support a means for receiving, from a UE, a measurement report indicating at least one TCI (TCI) state associated with at least one reference signal transmitted by a target DU to the UE. The configuration component 730 is capable of, configured to, or operable to support a means for transmitting, to the target DU based on the measurement report, an indication of a first set of one or more candidate TCI states from the at least one TCI state for a dynamic cell switch of the UE from a source cell of the source DU to a target cell of the target DU. The cell switch component 735 is capable of, configured to, or operable to support a means for transmitting, to the UE, a dynamic cell switch command instructing the UE to perform the dynamic cell switch from the source cell of the source DU to the target cell of the target DU, the dynamic cell switch command indicating a first TCI state of the first set of one or more candidate TCI states for transmission of a random access message or an uplink message to the target DU via the target cell.

Additionally, or alternatively, the communications manager 720 may support wireless communications at a target DU (DU) in accordance with examples as disclosed herein. The reference signal component 740 is capable of, configured to, or operable to support a means for transmitting a set of multiple reference signals associated with a set of multiple TCI (TCI) states. The configuration component 730 is capable of, configured to, or operable to support a means for receiving, from a source DU, an indication of a first set of one or more candidate TCI states from the set of multiple TCI states for a dynamic cell switch of a UE from a source cell of the source DU to a target cell of the target DU. The cell switch component 735 is capable of, configured to, or operable to support a means for receiving, from the UE, a random access message or an uplink message in accordance with a first TCI state of the first set of one or more candidate TCI states.

Figure 8:
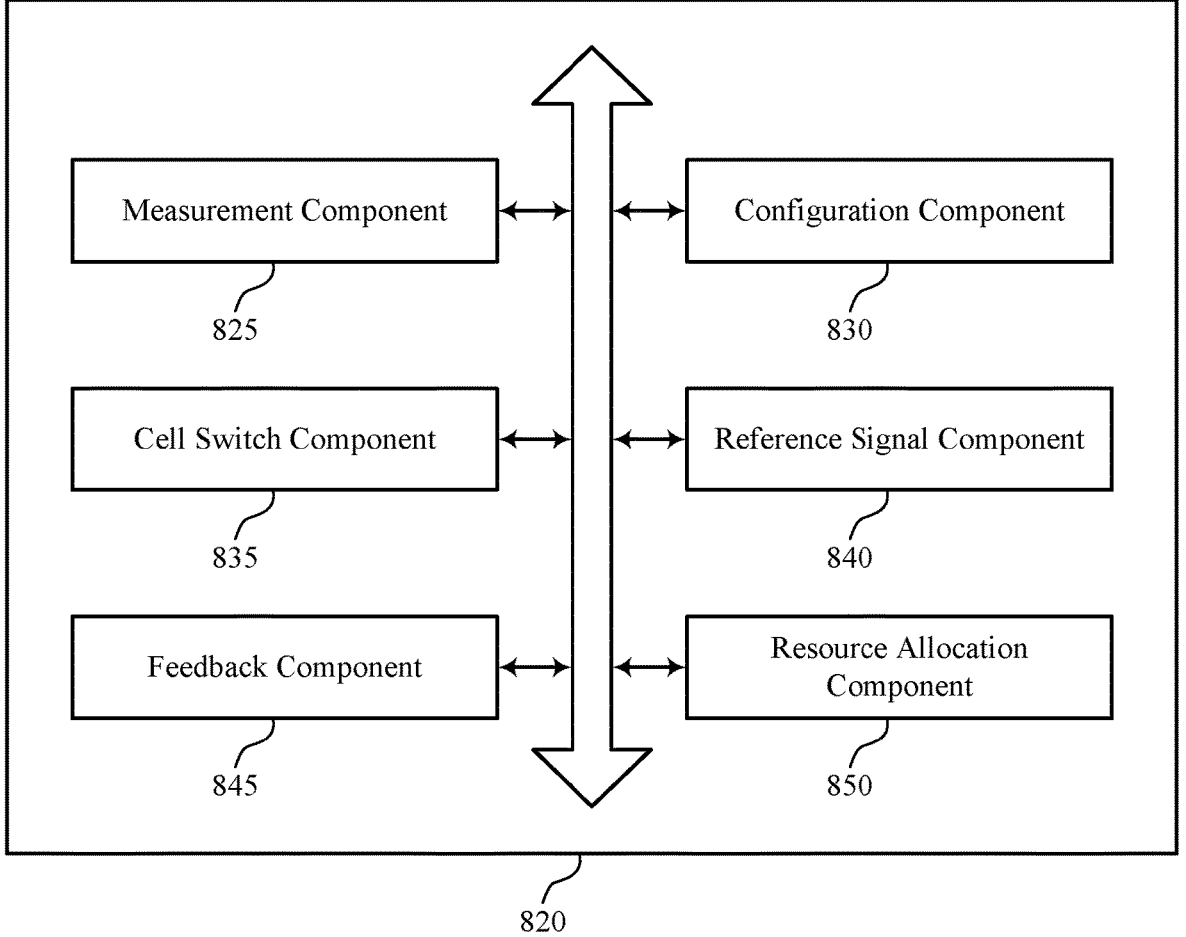
FIG. 8 shows a block diagram of a communications manager that supports TCI state indication for inter-DU LTM in accordance with one or more aspects of the present disclosure.

FIG. 8 shows a block diagram 800 of a communications manager 820 that supports TCI state indication for inter-DU LTM in accordance with one or more aspects of the present disclosure. The communications manager 820 may be an example of aspects of a communications manager 620, a communications manager 720, or both, as described herein. The communications manager 820, or various components thereof, may be an example of means for performing various aspects of TCI state indication for inter-DU LTM as described herein. For example, the communications manager 820 may include a measurement component 825, a configuration component 830, a cell switch component 835, a reference signal component 840, a feedback component 845, a resource allocation component 850, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications at a source DU (DU) in accordance with examples as disclosed herein. The measurement component 825 is capable of, configured to, or operable to support a means for receiving, from a UE, a measurement report indicating at least one TCI (TCI) state associated with at least one reference signal transmitted by a target DU to the UE. The configuration component 830 is capable of, configured to, or operable to support a means for transmitting, to the target DU based on the measurement report, an indication of a first set of one or more candidate TCI states from the at least one TCI state for a dynamic cell switch of the UE from a source cell of the source DU to a target cell of the target DU. The cell switch component 835 is capable of, configured to, or operable to support a means for transmitting, to the UE, a dynamic cell switch command instructing the UE to perform the dynamic cell switch from the source cell of the source DU to the target cell of the target DU, the dynamic cell switch command indicating a first TCI state of the first set of one or more candidate TCI states for transmission of a random access message or an uplink message to the target DU via the target cell.

In some examples, the feedback component 845 is capable of, configured to, or operable to support a means for receiving, from the target DU, a confirmation message indicating successful receipt of the indication of the first set of one or more candidate TCI states.

In some examples, the configuration component 830 is capable of, configured to, or operable to support a means for transmitting, to the target DU, a second indication of a second set of one or more candidate TCI states for the dynamic cell switch of the UE from the source cell of the source DU to the target cell of the target DU.

In some examples, the measurement component 825 is capable of, configured to, or operable to support a means for receiving, from the UE, a second measurement report indicating at least one second TCI state associated with at least one second reference signal transmitted by the target DU to the UE, where the second set of one or more candidate TCI states is selected from the at least one second TCI state.

In some examples, the resource allocation component 850 is capable of, configured to, or operable to support a means for receiving, from the target DU, a first control message indicating a resource allocation that identifies one or more resources reserved for the UE to perform the dynamic cell switch.

In some examples, the resource allocation component 850 is capable of, configured to, or operable to support a means for transmitting, to the UE, a second control message indicating the resource allocation for the dynamic cell switch.

In some examples, the first control message indicates a mapping between each TCI state of the first set of one or more candidate TCI states and the one or more resources reserved for the UE.

In some examples, the cell switch component 835 is capable of, configured to, or operable to support a means for identifying, from a set of multiple target DUs, the target DU as a candidate for the dynamic cell switch.

In some examples, the cell switch component 835 is capable of, configured to, or operable to support a means for transmitting, to the target DU, a notification indicating that the target DU is the candidate for the dynamic cell switch.

Additionally, or alternatively, the communications manager 820 may support wireless communications at a target DU (DU) in accordance with examples as disclosed herein. The reference signal component 840 is capable of, configured to, or operable to support a means for transmitting a set of multiple reference signals associated with a set of multiple TCI (TCI) states. In some examples, the configuration component 830 is capable of, configured to, or operable to support a means for receiving, from a source DU, an indication of a first set of one or more candidate TCI states from the set of multiple TCI states for a dynamic cell switch of a UE from a source cell of the source DU to a target cell of the target DU. In some examples, the cell switch component 835 is capable of, configured to, or operable to support a means for receiving, from the UE, a random access message or an uplink message in accordance with a first TCI state of the first set of one or more candidate TCI states.

In some examples, the feedback component 845 is capable of, configured to, or operable to support a means for transmitting, to the source DU, a confirmation message indicating successful receipt of the indication of the first set of one or more candidate TCI states.

In some examples, the configuration component 830 is capable of, configured to, or operable to support a means for receiving, from the source DU, a second indication of a second set of one or more candidate TCI states for the dynamic cell switch of the UE from the source cell of the source DU to the target cell of the target DU.

In some examples, the reference signal component 840 is capable of, configured to, or operable to support a means for transmitting, a second set of multiple reference signals associated with a second set of multiple TCI states, where the second set of one or more candidate TCI states are selected from the second set of multiple TCI states.

In some examples, the reference signal component 840 is capable of, configured to, or operable to support a means for transmitting a second set of multiple reference signals in accordance with each TCI state of the first set of one or more TCI states.

In some examples, the resource allocation component 850 is capable of, configured to, or operable to support a means for transmitting, to the source DU, a control message indicating a resource allocation that identifies one or more resources reserved for the UE to perform the dynamic cell switch.

In some examples, the control message indicates a mapping between each TCI state of the first set of one or more candidate TCI states and the one or more resources reserved for the UE.

In some examples, the cell switch component 835 is capable of, configured to, or operable to support a means for receiving, from the source DU, a notification indicating that the target DU is a candidate for the dynamic cell switch, where receiving the random access message or the uplink message is based on the notification.

In some examples, the cell switch component 835 is capable of, configured to, or operable to support a means for monitoring for the random access message or the uplink message in accordance with the first TCI state based on receiving the notification.

Figure 9:
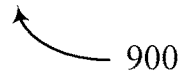
FIG. 9 shows a diagram of a system including a device that supports TCI state indication for inter-DU LTM in accordance with one or more aspects of the present disclosure.

FIG. 9 shows a diagram of a system 900 including a device 905 that supports TCI state indication for inter-DU LTM in accordance with one or more aspects of the present disclosure. The device 905 may be an example of or include the components of a device 605, a device 705, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, a memory 925, code 930, and a processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or memory components (for example, the processor 935, or the memory 925, or both), may be included in a chip or chip assembly that is installed in the device 905. In some examples, the transceiver may be operable to support communications via one or more communications links (e.g., a communication link 125, a backhaul communication link 120, a midhaul communication link 162, a fronthaul communication link 168).

The memory 925 may include RAM and ROM. The memory 925 may store computer-readable, computer-executable code 930 including instructions that, when executed by the processor 935, cause the device 905 to perform various functions described herein. The code 930 may be stored in a non-transitory computer-readable medium such as system memory or another type of memory. In some cases, the code 930 may not be directly executable by the processor 935 but may cause a computer (e.g., when compiled and executed) to perform functions described herein. In some cases, the memory 925 may contain, among other things, a BIOS which may control basic hardware or software operation such as the interaction with peripheral components or devices.

The processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 935 may be configured to operate a memory array using a memory controller. In some other cases, a memory controller may be integrated into the processor 935. The processor 935 may be configured to execute computer-readable instructions stored in a memory (e.g., the memory 925) to cause the device 905 to perform various functions (e.g., functions or tasks supporting TCI state indication for inter-DU LTM). For example, the device 905 or a component of the device 905 may include a processor 935 and memory 925 coupled with the processor 935, the processor 935 and memory 925 configured to perform various functions described herein. The processor 935 may be an example of a cloud-computing platform (e.g., one or more physical nodes and supporting software such as operating systems, virtual machines, or container instances) that may host the functions (e.g., by executing code 930) to perform the functions of the device 905. The processor 935 may be any one or more suitable processors capable of executing scripts or instructions of one or more software programs stored in the device 905 (such as within the memory 925). In some implementations, the processor 935 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the processor 935, or the transceiver 910, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 905 may transmit information output from the chip or modem. Additionally, or alternatively, in some implementations, the one or more interfaces may refer to an interface between the processing system of the chip or modem and a receiver, such that the device 905 may obtain information or signal inputs, and the information may be passed to the processing system. A person having ordinary skill in the art will readily recognize that a first interface also may obtain information or signal inputs, and a second interface also may output information or signal outputs.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the memory 925, the code 930, and the processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications at a source DU (DU) in accordance with examples as disclosed herein. For example, the communications manager 920 is capable of, configured to, or operable to support a means for receiving, from a UE, a measurement report indicating at least one TCI (TCI) state associated with at least one reference signal transmitted by a target DU to the UE. The communications manager 920 is capable of, configured to, or operable to support a means for transmitting, to the target DU based on the measurement report, an indication of a first set of one or more candidate TCI states from the at least one TCI state for a dynamic cell switch of the UE from a source cell of the source DU to a target cell of the target DU. The communications manager 920 is capable of, configured to, or operable to support a means for transmitting, to the UE, a dynamic cell switch command instructing the UE to perform the dynamic cell switch from the source cell of the source DU to the target cell of the target DU, the dynamic cell switch command indicating a first TCI state of the first set of one or more candidate TCI states for transmission of a random access message or an uplink message to the target DU via the target cell.

Additionally, or alternatively, the communications manager 920 may support wireless communications at a target DU (DU) in accordance with examples as disclosed herein. For example, the communications manager 920 is capable of, configured to, or operable to support a means for transmitting a set of multiple reference signals associated with a set of multiple TCI (TCI) states. The communications manager 920 is capable of, configured to, or operable to support a means for receiving, from a source DU, an indication of a first set of one or more candidate TCI states from the set of multiple TCI states for a dynamic cell switch of a UE from a source cell of the source DU to a target cell of the target DU. The communications manager 920 is capable of, configured to, or operable to support a means for receiving, from the UE, a random access message or an uplink message in accordance with a first TCI state of the first set of one or more candidate TCI states.

By including or configuring the communications manager 920 in accordance with examples as described herein, the device 905 may support techniques for TCI state indication for inter-DU LTM which may result improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, the processor 935, the memory 925, the code 930, or any combination thereof. For example, the code 930 may include instructions executable by the processor 935 to cause the device 905 to perform various aspects of TCI state indication for inter-DU LTM as described herein, or the processor 935 and the memory 925 may be otherwise configured to perform or support such operations.

FIG. 10 shows a block diagram 1000 of a device 1005 that supports TCI state indication for inter-DU LTM in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to TCI state indication for inter-DU LTM). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to TCI state indication for inter-DU LTM). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of TCI state indication for inter-DU LTM as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. For example, the communications manager 1020 is capable of, configured to, or operable to support a means for receiving, from a source DU (DU), a control message instructing the UE to perform a random access procedure via a target cell of a target DU, the control message indicating a first TCI (TCI) state for transmission of a first random access preamble of the random access procedure. The communications manager 1020 is capable of, configured to, or operable to support a means for transmitting, to the target DU, the first random access preamble via the target cell of the target DU in accordance with the first TCI state. The communications manager 1020 is capable of, configured to, or operable to support a means for receiving, from the source DU, a dynamic cell switch command instructing the UE to perform the dynamic cell switch from a source cell of the source DU to the target cell of the target DU. The communications manager 1020 is capable of, configured to, or operable to support a means for transmitting, in accordance with the first TCI state, a second random access preamble or an uplink message based on a time duration between transmission of the first random access preamble and reception of the dynamic cell switch command satisfying a time threshold.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for TCI state indication for inter-DU LTM which may result reduced processing, reduced power consumption, and more efficient utilization of communication resources, among other advantages.

Figure 11:
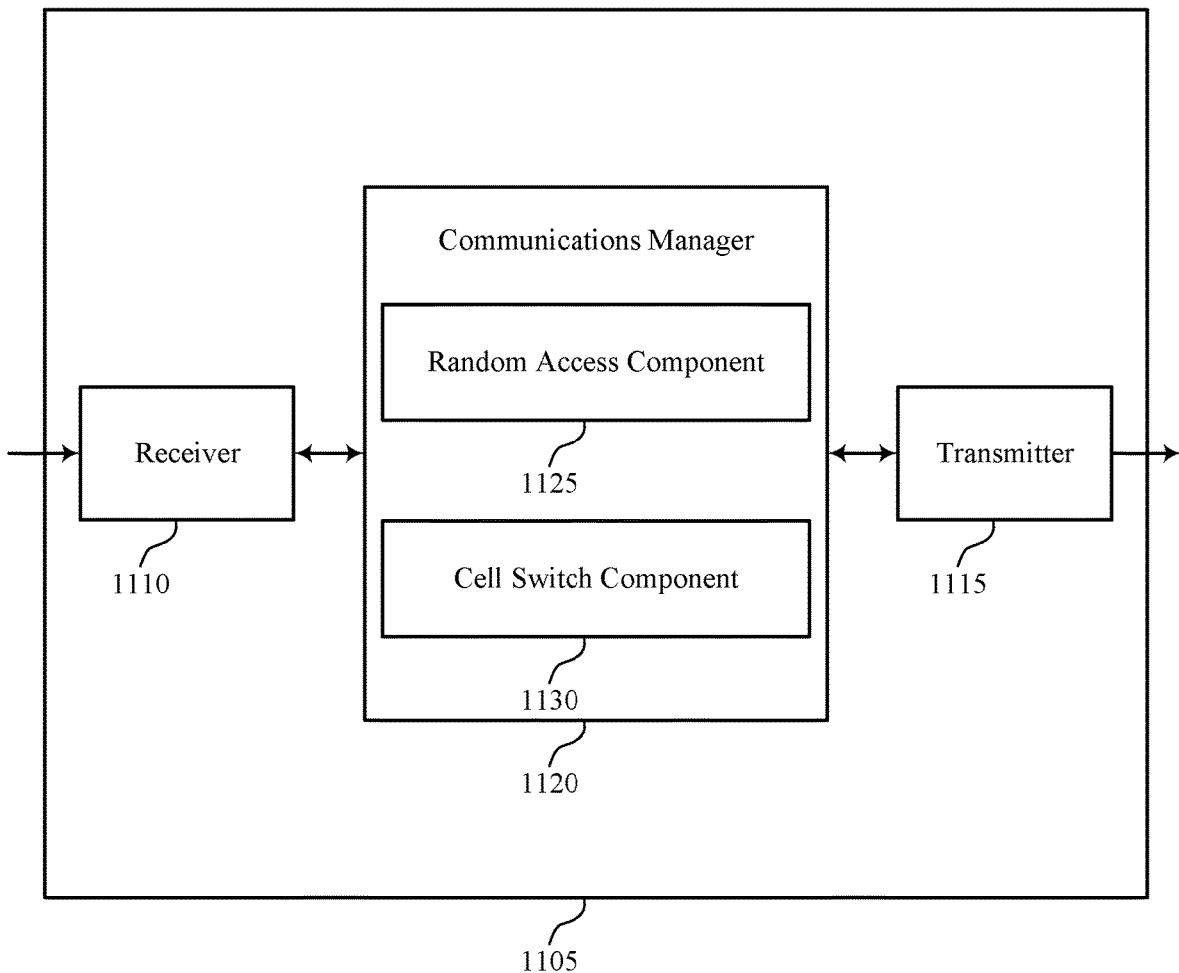

FIG. 11 shows a block diagram 1100 of a device 1105 that supports TCI state indication for inter-DU LTM in accordance with one or more aspects of the present disclosure.

The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to TCI state indication for inter-DU LTM). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to TCI state indication for inter-DU LTM). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of TCI state indication for inter-DU LTM as described herein. For example, the communications manager 1120 may include a random access component 1125 a cell switch component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a UE in accordance with examples as disclosed herein. The random access component 1125 is capable of, configured to, or operable to support a means for receiving, from a source DU (DU), a control message instructing the UE to perform a random access procedure via a target cell of a target DU, the control message indicating a first TCI (TCI) state for transmission of a first random access preamble of the random access procedure. The random access component 1125 is capable of, configured to, or operable to support a means for transmitting, to the target DU, the first random access preamble via the target cell of the target DU in accordance with the first TCI state. The cell switch component 1130 is capable of, configured to, or operable to support a means for receiving, from the source DU, a dynamic cell switch command instructing the UE to perform the dynamic cell switch from a source cell of the source DU to the target cell of the target DU. The cell switch component 1130 is capable of, configured to, or operable to support a means for transmitting, in accordance with the first TCI state, a second random access preamble or an uplink message based on a time duration between transmission of the first random access preamble and reception of the dynamic cell switch command satisfying a time threshold.

Figure 12:
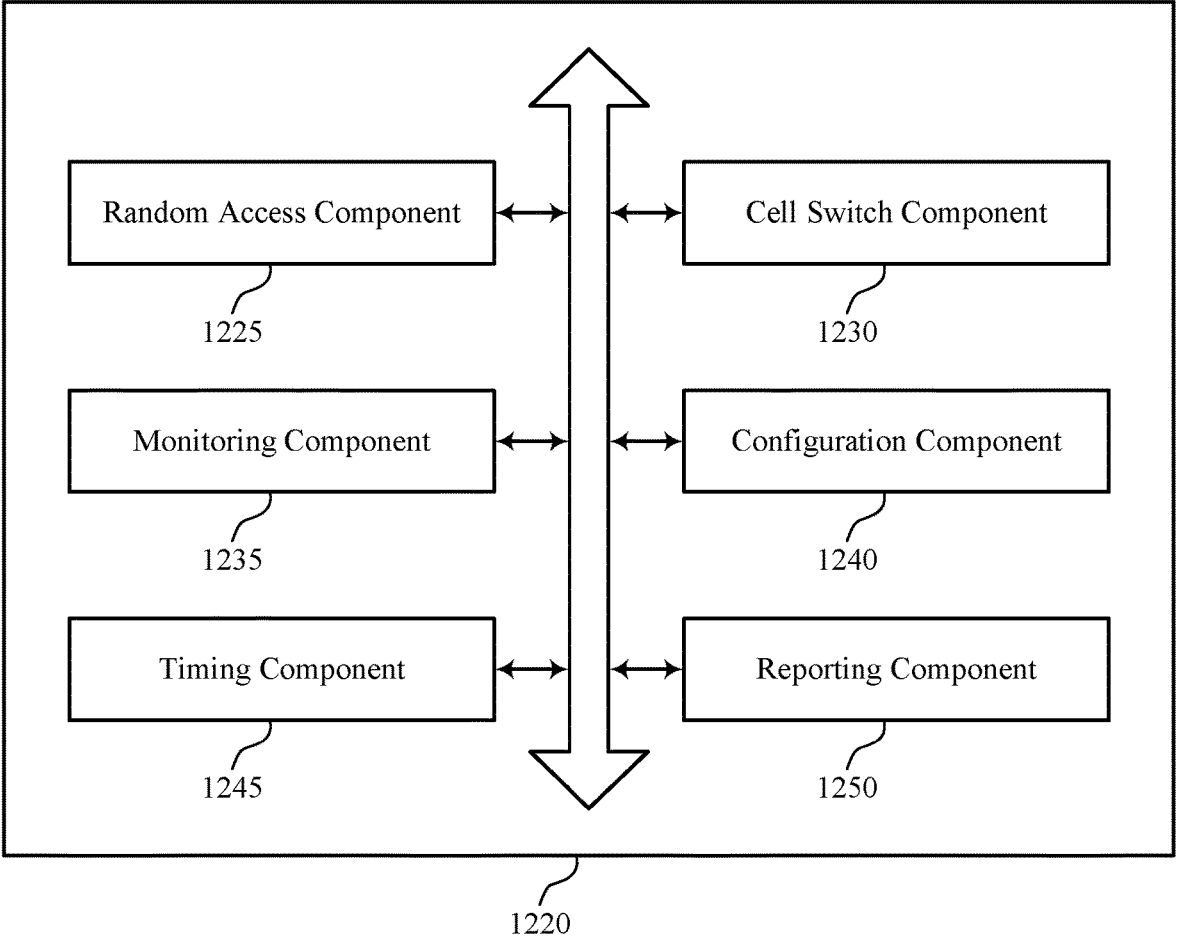
FIG. 12 shows a block diagram of a communications manager that supports TCI state indication for inter-DU LTM in accordance with one or more aspects of the present disclosure.

FIG. 12 shows a block diagram 1200 of a communications manager 1220 that supports TCI state indication for inter-DU LTM in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of TCI state indication for inter-DU LTM as described herein. For example, the communications manager 1220 may include a random access component 1225, a cell switch component 1230, a monitoring component 1235, a configuration component 1240, a timing component 1245, a reporting component 1250, or any combination thereof. Each of these components may communicate, directly or indirectly, with one another (e.g., via one or more buses).

The communications manager 1220 may support wireless communications at a UE in accordance with examples as disclosed herein. The random access component 1225 is capable of, configured to, or operable to support a means for receiving, from a source DU (DU), a control message instructing the UE to perform a random access procedure via a target cell of a target DU, the control message indicating a first TCI (TCI) state for transmission of a first random access preamble of the random access procedure. In some examples, the random access component 1225 is capable of, configured to, or operable to support a means for transmitting, to the target DU, the first random access preamble via the target cell of the target DU in accordance with the first TCI state. The cell switch component 1230 is capable of, configured to, or operable to support a means for receiving, from the source DU, a dynamic cell switch command instructing the UE to perform the dynamic cell switch from a source cell of the source DU to the target cell of the target DU. In some examples, the cell switch component 1230 is capable of, configured to, or operable to support a means for transmitting, in accordance with the first TCI state, a second random access preamble or an uplink message based on a time duration between transmission of the first random access preamble and reception of the dynamic cell switch command satisfying a time threshold.

In some examples, the monitoring component 1235 is capable of, configured to, or operable to support a means for receiving, from the target DU, a set of multiple reference signals associated with a set of multiple TCI states including at least the first TCI state.

In some examples, the reporting component 1250 is capable of, configured to, or operable to support a means for transmitting, to the source DU, a measurement report indicating at least the first TCI state associated with a first reference signal of the set of multiple reference signals.

In some examples, the configuration component 1240 is capable of, configured to, or operable to support a means for receiving, from the source DU, a second control message indicating a resource allocation that identifies one or more resources reserved for the UE to perform the dynamic cell switch.

In some examples, the second control message indicates a mapping between the first TCI state and at least one resource of the one or more resources reserved for the UE to perform the dynamic cell switch.

In some examples, the second random access preamble or the uplink message is transmitted in the at least one resource corresponding to the first TCI state.

In some examples, the timing component 1245 is capable of, configured to, or operable to support a means for initiating a timer based at least in part transmitting the first random access preamble, where expiration of the timer is based on the time threshold.

In some examples, the UE transmits the second random access preamble based on the time duration exceeding the time threshold.

In some examples, the UE transmits the uplink message based on the time duration failing to exceed the time threshold.

Figure 13:
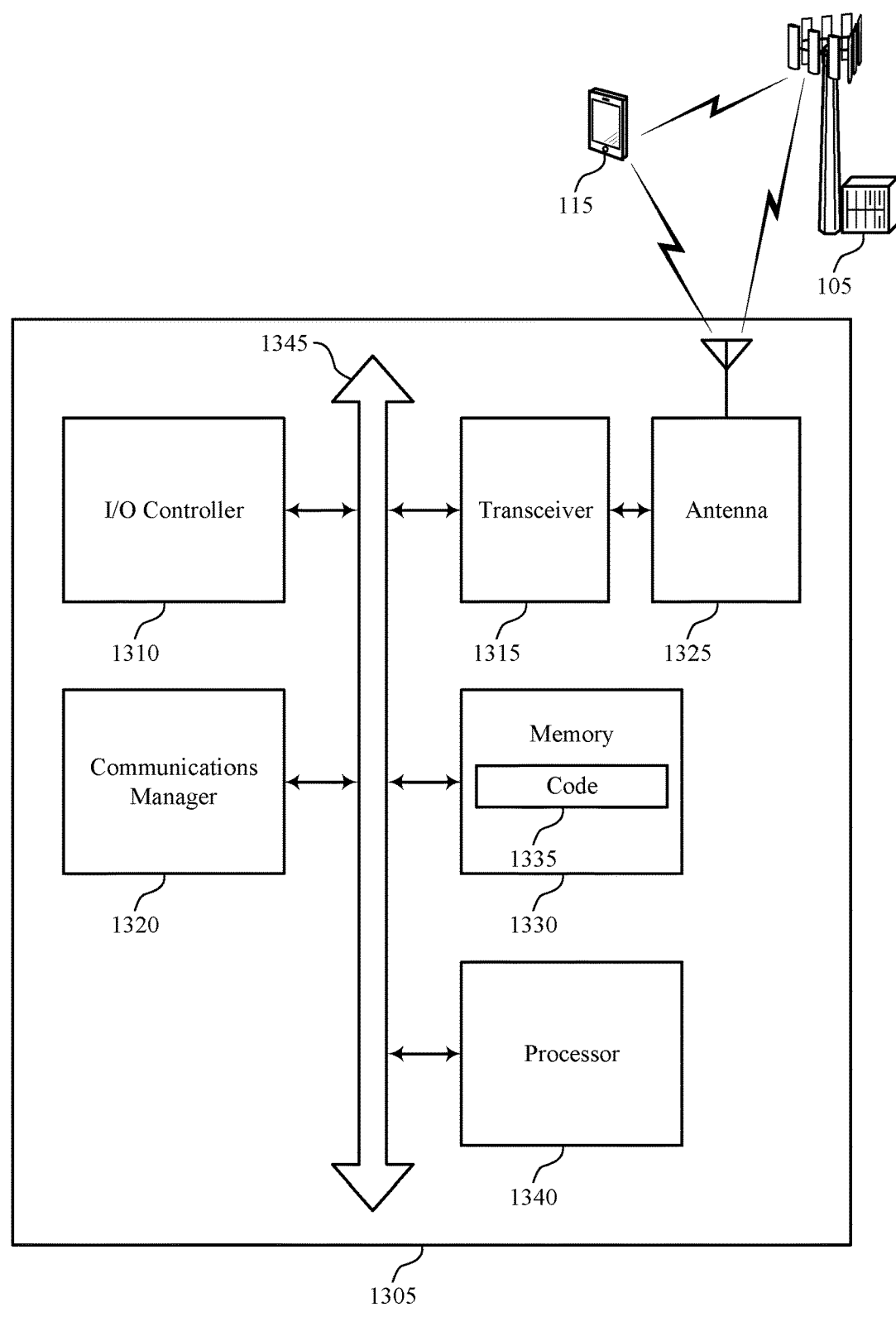
FIG. 13 shows a diagram of a system including a device that supports TCI state indication for inter-DU LTM in accordance with one or more aspects of the present disclosure.

FIG. 13 shows a diagram of a system 1300 including a device 1305 that supports TCI state indication for inter-DU LTM in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting TCI state indication for inter-DU LTM). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communications at a UE in accordance with examples as disclosed herein. For example, the communications manager 1320 is capable of, configured to, or operable to support a means for receiving, from a source DU (DU), a control message instructing the UE to perform a random access procedure via a target cell of a target DU, the control message indicating a first TCI (TCI) state for transmission of a first random access preamble of the random access procedure. The communications manager 1320 is capable of, configured to, or operable to support a means for transmitting, to the target DU, the first random access preamble via the target cell of the target DU in accordance with the first TCI state. The communications manager 1320 is capable of, configured to, or operable to support a means for receiving, from the source DU, a dynamic cell switch command instructing the UE to perform the dynamic cell switch from a source cell of the source DU to the target cell of the target DU. The communications manager 1320 is capable of, configured to, or operable to support a means for transmitting, in accordance with the first TCI state, a second random access preamble or an uplink message based on a time duration between transmission of the first random access preamble and reception of the dynamic cell switch command satisfying a time threshold.

By including or configuring the communications manager 1320 in accordance with examples as described herein, the device 1305 may support techniques for TCI state indication for inter-DU LTM which may result improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of TCI state indication for inter-DU LTM as described herein, or the processor 1340 and the memory 1330 may be otherwise configured to perform or support such operations.

FIG. 14 shows a flowchart illustrating a method 1400 that supports TCI state indication for inter-DU LTM in accordance with aspects of the present disclosure. The operations of the method 1400 may be implemented by a network entity or its components as described herein. For example, the operations of the method 1400 may be performed by a network entity as described with reference to FIGS. 1 through 9. In some examples, a network entity may execute a set of instructions to control the functional elements of the wireless network entity to perform the described functions. Additionally, or alternatively, the wireless network entity may perform aspects of the described functions using special-purpose hardware.

At 1405, the method may include receiving, from a UE, a measurement report indicating at least one TCI (TCI) state associated with at least one reference signal transmitted by a target DU to the UE. The operations of 1405 may be performed in accordance with examples as disclosed herein. In some examples, aspects of the operations of 1405 may be performed by a measurement component 825 as described with reference to FIG. 8.

At 1410, the method may include transmitting, to the target DU based on the measurement report, an indication of a first set of one or more candidate TCI states from the at least one TCI state for a dynamic cell switch of the UE from a source cell of the source DU to a target cell of the target DU. The operations of 1410 may be performed in accordance with examples as disclosed herein. In some examples, aspects of the operations of 1410 may be performed by a configuration component 830 as described with reference to FIG. 8.

Figure 15:
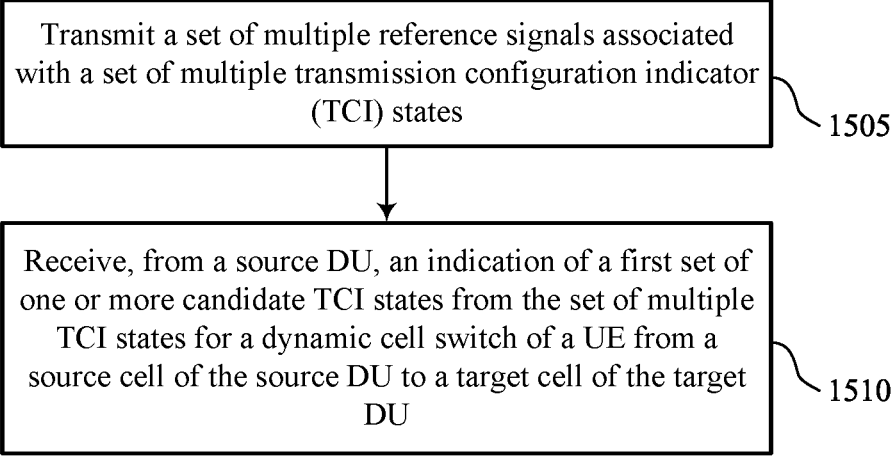

FIG. 15 shows a flowchart illustrating a method 1500 that supports TCI state indication for inter-DU LTM in accordance with aspects of the present disclosure. The operations of the method 1500 may be implemented by a network entity or its components as described herein. For example, the operations of the method 1500 may be performed by a network entity as described with reference to FIGS. 1 through 9. In some examples, a network entity may execute a set of instructions to control the functional elements of the wireless network entity to perform the described functions. Additionally, or alternatively, the wireless network entity may perform aspects of the described functions using special-purpose hardware.

At 1505, the method may include transmitting a set of multiple reference signals associated with a set of multiple TCI (TCI) states. The operations of 1505 may be performed in accordance with examples as disclosed herein. In some examples, aspects of the operations of 1505 may be performed by a reference signal component 840 as described with reference to FIG. 8.

At 1510, the method may include receiving, from a source DU, an indication of a first set of one or more candidate TCI states from the set of multiple TCI states for a dynamic cell switch of a UE from a source cell of the source DU to a target cell of the target DU. The operations of 1510 may be performed in accordance with examples as disclosed herein. In some examples, aspects of the operations of 1510 may be performed by a configuration component 830 as described with reference to FIG. 8.

FIG. 16 shows a flowchart illustrating a method 1600 that supports TCI state indication for inter-DU LTM in accordance with aspects of the present disclosure. The operations of the method 1600 may be implemented by a UE or its components as described herein. For example, the operations of the method 1600 may be performed by a UE 115 as described with reference to FIGS. 1 through 5 and 10 through 13. In some examples, a UE may execute a set of instructions to control the functional elements of the wireless UE to perform the described functions. Additionally, or alternatively, the wireless UE may perform aspects of the described functions using special-purpose hardware.

At 1605, the method may include receiving, from a source DU (DU), a control message instructing the UE to perform a random access procedure via a target cell of a target DU, the control message indicating a first TCI (TCI) state for transmission of a first random access preamble of the random access procedure. The operations of 1605 may be performed in accordance with examples as disclosed herein. In some examples, aspects of the operations of 1605 may be performed by a random access component 1225 as described with reference to FIG. 12.

At 1610, the method may include transmitting, to the target DU, the first random access preamble via the target cell of the target DU in accordance with the first TCI state. The operations of 1610 may be performed in accordance with examples as disclosed herein. In some examples, aspects of the operations of 1610 may be performed by a random access component 1225 as described with reference to FIG. 12.

At 1615, the method may include performing a dynamic cell switch from a source cell of the source DU to the target cell of the target DU. The operations of 1615 may be performed in accordance with examples as disclosed herein. In some examples, aspects of the operations of 1615 may be performed by a cell switch component 1230 as described with reference to FIG. 12.

At 1620, the method may include transmitting, in accordance with the first TCI state, a second random access preamble or an uplink message based on performing the dynamic cell switch. The operations of 1620 may be performed in accordance with examples as disclosed herein. In some examples, aspects of the operations of 1620 may be performed by a cell switch component 1230 as described with reference to FIG. 12.

The following provides an overview of aspects of the present disclosure:

Aspect 1: A method for wireless communications at a source DU, comprising: receiving, from a UE, a measurement report indicating at least one TCI state associated with at least one reference signal transmitted by a target DU to the UE; and transmitting, to the target DU based at least in part on the measurement report, an indication of a first set of one or more candidate TCI states from the at least one TCI state for a dynamic cell switch of the UE from a source cell of the source DU to a target cell of the target DU.

Aspect 2: The method of aspect 1, further comprising: transmitting, to the UE, a dynamic cell switch command instructing the UE to perform the dynamic cell switch from the source cell of the source DU to the target cell of the target DU, the dynamic cell switch command indicating a first TCI state of the first set of one or more candidate TCI states for transmission of a random access message or an uplink message to the target DU via the target cell.

Aspect 3: The method of any of aspects 1 through 2, further comprising: receiving, from the target DU, a confirmation message indicating successful receipt of the indication of the first set of one or more candidate TCI states.

Aspect 4: The method of any of aspects 1 through 3, further comprising: transmitting, to the target DU, a second indication of a second set of one or more candidate TCI states for the dynamic cell switch of the UE from the source cell of the source DU to the target cell of the target DU.

Aspect 5: The method of aspect 4, further comprising: receiving, from the UE, a second measurement report indicating at least one second TCI state associated with at least one second reference signal transmitted by the target DU to the UE, wherein the second set of one or more candidate TCI states is selected from the at least one second TCI state.

Aspect 6: The method of any of aspects 1 through 5, further comprising: receiving, from the target DU, a first control message indicating a resource allocation that identifies one or more resources reserved for the UE to perform the dynamic cell switch.

Aspect 7: The method of aspect 6, further comprising: transmitting, to the UE, a second control message indicating the resource allocation for the dynamic cell switch.

Aspect 8: The method of any of aspects 6 through 7, wherein the first control message indicates a mapping between each TCI state of the first set of one or more candidate TCI states and the one or more resources reserved for the UE.

Aspect 9: The method of any of aspects 1 through 8, further comprising: identifying, from a plurality of target DUs, the target DU as a candidate for the dynamic cell switch.

Aspect 10: The method of aspect 9, further comprising: transmitting, to the target DU, a notification indicating that the target DU is the candidate for the dynamic cell switch.

Aspect 11: A method for wireless communications at a target DU, comprising: transmitting a plurality of reference signals associated with a plurality of TCI states; and receiving, from a source DU, an indication of a first set of one or more candidate TCI states from the plurality of TCI states for a dynamic cell switch of a UE from a source cell of the source DU to a target cell of the target DU.

Aspect 12: The method of aspect 11, further comprising: receiving, from the UE, a random access message or an uplink message in accordance with a first TCI state of the first set of one or more candidate TCI states.

Aspect 13: The method of any of aspects 11 through 12, further comprising: transmitting, to the source DU, a confirmation message indicating successful receipt of the indication of the first set of one or more candidate TCI states.

Aspect 14: The method of any of aspects 11 through 13, further comprising: receiving, from the source DU, a second indication of a second set of one or more candidate TCI states for the dynamic cell switch of the UE from the source cell of the source DU to the target cell of the target DU.

Aspect 15: The method of aspect 14, further comprising: transmitting, a second plurality of reference signals associated with a second plurality of TCI states, wherein the second set of one or more candidate TCI states are selected from the second plurality of TCI states.

Aspect 16: The method of any of aspects 11 through 15, further comprising: transmitting a second plurality of reference signals in accordance with each TCI state of the first set of one or more TCI states.

Aspect 17: The method of any of aspects 11 through 16, further comprising: transmitting, to the source DU, a control message indicating a resource allocation that identifies one or more resources reserved for the UE to perform the dynamic cell switch.

Aspect 18: The method of aspect 17, wherein the control message indicates a mapping between each TCI state of the first set of one or more candidate TCI states and the one or more resources reserved for the UE.

Aspect 19: The method of any of aspects 11 through 18, further comprising: receiving, from the source DU, a notification indicating that the target DU is a candidate for the dynamic cell switch, wherein receiving the random access message or the uplink message is based at least in part on the notification.

Aspect 20: The method of aspect 19, further comprising: monitoring for the random access message or the uplink message in accordance with the first TCI state based at least in part on receiving the notification.

Aspect 21: A method for wireless communications at a UE, comprising: receiving, from a source DU, a control message instructing the UE to perform a random access procedure via a target cell of a target DU, the control message indicating a first TCI state for transmission of a first random access preamble of the random access procedure; transmitting, to the target DU, the first random access preamble via the target cell of the target DU in accordance with the first TCI state; performing a dynamic cell switch from a source cell of the source DU to the target cell of the target DU; and transmitting, in accordance with the first TCI state, a second random access preamble or an uplink message based at least in part on the dynamic cell switch.

Aspect 22: The method of aspect 21, further comprising: receiving, from the source DU, a dynamic cell switch command instructing the UE to perform the dynamic cell switch from the source cell of the source DU to the target cell of the target DU, wherein the second random access preamble or the uplink message is transmitted based at least in part on a time duration between transmission of the first random access preamble and reception of the dynamic cell switch command satisfying a time threshold Aspect 23: The method of aspect 22, further comprising: initiating a timer based at least in part the first random access preamble being transmitted, where expiration of the timer is based at least in part on the time threshold.

Aspect 24: The method of aspect 23, wherein the second random access preamble is transmitted based at least in part on the time duration exceeding the time threshold.

Aspect 25: The method of aspect 23, wherein the uplink message is transmitted based at least in part on the time duration failing to exceed the time threshold.

Aspect 26: The method of any of aspects 21 through 24, further comprising: receiving, from the target DU, a plurality of reference signals associated with a plurality of TCI states including at least the first TCI state.

Aspect 27: The method of aspect 21, further comprising: transmitting, to the source DU, a measurement report indicating at least the first TCI state associated with a first reference signal of the plurality of reference signals.

Aspect 28: The method of any of aspects 21 through 27, further comprising: receiving, from the source DU, a second control message indicating a resource allocation that identifies one or more resources reserved for the UE to perform the dynamic cell switch.

Aspect 29: The method of aspect 28, wherein the second control message indicates a mapping between the first TCI state and at least one resource of the one or more resources reserved for the UE to perform the dynamic cell switch.

Aspect 30: The method of aspect 29, wherein the second random access preamble or the uplink message is transmitted in the at least one resource corresponding to the first TCI state.

Aspect 31: An apparatus for wireless communications at a source DU, comprising one or more processors; one or more memories coupled with the one or more processors; and instructions stored in the one or more memories and executable by the one or more processors to cause the apparatus to perform a method of any of aspects 1 through 10.

Aspect 32: An apparatus for wireless communications at a source DU, comprising at least one means for performing a method of any of aspects 1 through 10.

Aspect 33: A non-transitory computer-readable medium storing code for wireless communications at a source DU, the code comprising instructions executable by one or more processors to perform a method of any of aspects 1 through 10.

Aspect 34: An apparatus for wireless communications at a target DU, comprising one or more processors; one or more memories coupled with the one or more processors; and instructions stored in the one or more memories and executable by the one or more processors to cause the apparatus to perform a method of any of aspects 11 through 20.

Aspect 35: An apparatus for wireless communications at a target DU, comprising at least one means for performing a method of any of aspects 11 through 20.

Aspect 36: A non-transitory computer-readable medium storing code for wireless communications at a target DU, the code comprising instructions executable by one or more processors to perform a method of any of aspects 11 through 20.

Aspect 37: An apparatus for wireless communications at a UE, comprising a one or more processors; one or more memories coupled with the one or more processors; and instructions stored in the one or more memories and executable by the one or more processors to cause the apparatus to perform a method of any of aspects 21 through 30.

Aspect 38: An apparatus for wireless communications at a UE, comprising at least one means for performing a method of any of aspects 21 through 30.

Aspect 39: A non-transitory computer-readable medium storing code for wireless communications at a UE, the code comprising instructions executable by one or more processors to perform a method of any of aspects 21 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a source distributed unit (DU), comprising:
   one or more memories storing processor-executable code; and
   one or more processors coupled with the one or more memories and operable to execute the code to cause the apparatus to:
      receive, from a user equipment (UE), a measurement report indicating at least one transmission configuration indicator (TCI) state associated with at least one reference signal transmitted by a target DU to the UE;

transmit, to the target DU based at least in part on the measurement report, an indication of a first set of one or more candidate TCI states from the at least one TCI state for a dynamic cell switch of the UE from a source cell of the source DU to a target cell of the target DU; and receive, from the target DU, a first control message indicating a resource allocation that identifies one or more resources reserved for the UE to perform the dynamic cell switch.

2. The apparatus of claim 1, wherein the one or more processors are further operable to cause the apparatus to:

transmit, to the UE, a dynamic cell switch command instructing the UE to perform the dynamic cell switch from the source cell of the source DU to the target cell of the target DU, the dynamic cell switch command indicating a first TCI state of the first set of one or more candidate TCI states for transmission of a random access message or an uplink message to the target DU via the target cell.

3. The apparatus of claim 1, wherein the one or more processors are further operable to cause the apparatus to:

receive, from the target DU, a confirmation message indicating successful receipt of the indication of the first set of one or more candidate TCI states.

4. The apparatus of claim 1, wherein the one or more processors are further operable to cause the apparatus to:

transmit, to the target DU, a second indication of a second set of one or more candidate TCI states for the dynamic cell switch of the UE from the source cell of the source DU to the target cell of the target DU.

5. The apparatus of claim 4, wherein the one or more processors are further operable to cause the apparatus to:

receive, from the UE, a second measurement report indicating at least one second TCI state associated with at least one second reference signal transmitted by the target DU to the UE, wherein the second set of one or more candidate TCI states is selected from the at least one second TCI state.

6. The apparatus of claim 1, wherein the one or more processors are further operable to cause the apparatus to:

transmit, to the UE, a second control message indicating the resource allocation for the dynamic cell switch.

7. The apparatus of claim 1, wherein the first control message indicates a mapping between each TCI state of the first set of one or more candidate TCI states and the one or more resources reserved for the UE.

8. The apparatus of claim 1, wherein the one or more processors are further operable to cause the apparatus to:

identify, from a plurality of target DUs, the target DU as a candidate for the dynamic cell switch.

9. The apparatus of claim 8, wherein the one or more processors are further operable to cause the apparatus to:

transmit, to the target DU, a notification indicating that the target DU is the candidate for the dynamic cell switch.

10. An apparatus for wireless communications at a target distributed unit (DU), comprising:

one or more memories storing processor-executable code; and one or more processors coupled with the one or more memories and operable to execute the code to cause the apparatus to:

transmit a plurality of reference signals associated with a plurality of transmission configuration indicator (TCI) states;

receive, from a source DU, an indication of a first set of one or more candidate TCI states from the plurality of TCI states for a dynamic cell switch of a user equipment (UE) from a source cell of the source DU to a target cell of the target DU; and transmit, to the source DU, a control message indicating a resource allocation that identifies one or more resources reserved for the UE to perform the dynamic cell switch.

11. The apparatus of claim 10, wherein the one or more processors are further operable to cause the apparatus to:

receive, from the UE, a random access message or an uplink message in accordance with a first TCI state of the first set of one or more candidate TCI states.

12. The apparatus of claim 10, wherein the one or more processors are further operable to cause the apparatus to:

transmit, to the source DU, a confirmation message indicating successful receipt of the indication of the first set of one or more candidate TCI states.

13. The apparatus of claim 10, wherein the one or more processors are further operable to cause the apparatus to:

receive, from the source DU, a second indication of a second set of one or more candidate TCI states for the dynamic cell switch of the UE from the source cell of the source DU to the target cell of the target DU.

14. The apparatus of claim 13, wherein the one or more processors are further operable to cause the apparatus to:

transmit, a second plurality of reference signals associated with a second plurality of TCI states, wherein the second set of one or more candidate TCI states are selected from the second plurality of TCI states.

15. The apparatus of claim 10, wherein the one or more processors are further operable to cause the apparatus to:

transmit a second plurality of reference signals in accordance with each TCI state of the first set of one or more candidate TCI states.

16. The apparatus of claim 10, wherein the control message indicates a mapping between each TCI state of the first set of one or more candidate TCI states and the one or more resources reserved for the UE.

17. The apparatus of claim 10, wherein the one or more processors are further operable to cause the apparatus to:

receive, from the source DU, a notification indicating that the target DU is a candidate for the dynamic cell switch.

18. An apparatus for wireless communications at a user equipment (UE), comprising:

one or more memories storing processor-executable code; and one or more processors coupled with the one or more memories and operable to execute the code to cause the apparatus to:

receive, from a source distributed unit (DU), a control message instructing the UE to perform a random access procedure via a target cell of a target DU, the control message indicating a first transmission configuration indicator (TCI) state for transmission of a first random access preamble of the random access procedure;

transmit, to the target DU, the first random access preamble via the target cell of the target DU in accordance with the first TCI state;

perform a dynamic cell switch from a source cell of the source DU to the target cell of the target DU; and transmit, in accordance with the first TCI state, a second random access preamble based at least in part on the dynamic cell switch.

\*    \*    \*    \*    \*